(12) United States Patent
Henmi

(10) Patent No.: US 10,154,174 B2
(45) Date of Patent: Dec. 11, 2018

(54) IMAGE FORMING APPARATUS

(71) Applicant: Oki Data Corporation, Tokyo (JP)

(72) Inventor: Yusuke Henmi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/628,212

(22) Filed: Jun. 20, 2017

(65) Prior Publication Data

US 2017/0374233 A1  Dec. 28, 2017

(30) Foreign Application Priority Data

Jun. 27, 2016 (JP) ................................ 2016-126215

(51) Int. Cl.
  *H04N 1/60* (2006.01)
  *H04N 1/00* (2006.01)
  (Continued)

(52) U.S. Cl.
  CPC ........... *H04N 1/60* (2013.01); *H04N 1/00748* (2013.01); *H04N 1/4092* (2013.01); *H04N 1/58* (2013.01)

(58) Field of Classification Search
  CPC .... H04N 1/00748; H04N 1/4092; H04N 1/58; H04N 1/60; H04N 1/40062; H04N 1/6027; G06T 2207/10024; G06T 2207/20192; G06T 2207/20012; G06T 5/002; G06T 5/003; G06T 2207/10008; G06T 2207/30144; G06T 5/001; G06T 7/001; G06T 5/009; G06T 5/30; G06T 7/12; G06T 7/155; G16H 10/20; G16H 10/60; G16H 15/00; G16H 50/20; G16H 50/70; C12Q 1/6816; C12Q 2565/629; B41C 1/1083; G03G 15/011; G06F 12/0802; G06F 12/121; G06F 3/1208; G06F 3/1242; G06F 3/1284; B01L 2200/0647;
  (Continued)

(56) References Cited

U.S. PATENT DOCUMENTS 9,235,179 B2 *  1/2016  Watanabe .......... G03G 15/5058
2005/0030562 A1 *  2/2005  Hama .................. H04N 1/4078
                                          358/1.9

(Continued)

FOREIGN PATENT DOCUMENTS

JP  2008-141623 A  6/2008

*Primary Examiner* — Negussie Worku
(74) *Attorney, Agent, or Firm* — Muncy, Geissler, Olds & Lowe, P.C.

(57) ABSTRACT

An image forming apparatus includes an image processing part performing a correction process and an image forming part respectively forming first and second images on medium. At a boundary of the first and second images, these images have first and second edge portions. When a first image width of the first image data is narrower than a predetermined width, the first image width is defined as a length determined from one portion of the first edge portion, the image processing part performs the correction process by selectively moving one of the first and second edge portions based on a pixel value of the first image. The image processing part obtains a degree of blackness of the first image based on the pixel value. When the degree of blackness is higher than a predetermined value, the image processing part performs the correction process by moving the second edge portion.

20 Claims, 28 Drawing Sheets

(51) Int. Cl.
*H04N 1/409* (2006.01)
*H04N 1/58* (2006.01)

(58) Field of Classification Search
CPC ......... B01L 2200/0668; B01L 2300/04; B01L 2300/0645; B01L 2300/0654; B01L 2300/0816; B01L 2300/0864; B01L 2300/0867; B01L 2400/0415; B01L 2400/0439; B01L 2400/0487; B01L 2400/0688; B01L 3/502746; B01L 3/502761
USPC ....... 358/1.9, 518, 540, 504, 1.15, 448, 450, 358/538, 539; 382/167
See application file for complete search history.

(56) References Cited

U.S. PATENT DOCUMENTS

| | | | | |
|---|---|---|---|---|
| 2005/0243334 A1* | 11/2005 | Sato | ..................... | G06K 9/4633 358/1.3 |
| 2008/0055654 A1* | 3/2008 | Tamura | .................. | G06K 15/02 358/3.26 |
| 2008/0259366 A1* | 10/2008 | Eguchi | ..................... | H04N 1/58 358/1.9 |
| 2010/0027040 A1* | 2/2010 | Kuroda | .............. | G03G 15/0173 358/1.9 |
| 2010/0259771 A1* | 10/2010 | Sakamoto | .......... | H04N 1/40068 358/1.2 |
| 2010/0322666 A1* | 12/2010 | Inomata | ............. | G03G 15/0896 399/120 |
| 2012/0327479 A1* | 12/2012 | Komatsu | .................. | H04N 1/58 358/3.06 |
| 2013/0330108 A1* | 12/2013 | Watanabe | .......... | G03G 15/5058 399/301 |
| 2015/0015918 A1* | 1/2015 | Eguchi | ............... | G06K 15/1872 358/3.27 |
| 2016/0072982 A1* | 3/2016 | Muraishi | .................. | H04N 1/58 358/2.1 |
| 2016/0216670 A1* | 7/2016 | Eda | ..................... | G03G 15/5012 |
| 2016/0314599 A1* | 10/2016 | Genda | ..................... | G06T 5/009 |
| 2017/0331982 A1* | 11/2017 | Henmi | ............... | H04N 1/00748 |

* cited by examiner

| | | | | | | | | |
|---|---|---|---|---|---|---|---|---|
| 0 | 0 | 0 | 0 | 0 | 0 | 0 | 0 | |
| 0 | 0 | 0 | 0 | 0 | 0 | 0 | 0 | |
| 0 | 0 | 1 | 1 | 1 | 1 | 1 | 1 | |
| 0 | 0 | 1 | 1 | 1 | 1 | 1 | 1 | |
| 0 | 0 | 1 | 1 | 1 | 1 | 1 | 1 | |
| 0 | 0 | 1 | 1 | 1 | 1 | 1 | 1 | — A |
| 0 | 0 | 1 | 1 | 1 | 1 | 0 | 0 | |
| 0 | 0 | 0 | 0 | 0 | 0 | 0 | 0 | |

B
Edge Portion

Fig. 4E

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | $R-L_w$ | $L_w$ | $L_w$ | $L_w$ | $L_w$ | $L_w$ |
| 0 | 0 | R | $R-L_w$ | $L_w$ | $L_w$ | $L_w$ | $L_w$ |
| 0 | 0 | R | R | R | $U_p-L_w$ | $U_p$ | $U_p$ |
| 0 | 0 | R | $R-U_p$ | $U_p$ | $L-U_p$ | $U_p$ | $U_p$ |
| 0 | 0 | $R-U_p$ | $U_p$ | $U_p$ | $L-U_p$ | 0 | 0 |
| 0 | 0 | 0 | 0 | 0 | 0 | 0 | 0 |

$U_p$: Upper Direction
$L_w$: Lower Direction
R: Right Direction
L: Left Direction

Fig. 5

| Upper Pixel | Lower Pixel | Left Pixel | Right Pixel | Edge Direction |
|---|---|---|---|---|
| 0 | 0 | 0 | 0 | $U_p$-$L_w$-L-R |
| 0 | 0 | 0 | 1 | R |
| 0 | 0 | 1 | 0 | L |
| 0 | 0 | 1 | 1 | L-R |
| 0 | 1 | 0 | 0 | $L_w$ |
| 0 | 1 | 0 | 1 | R-$L_w$ |
| 0 | 1 | 1 | 0 | L-$L_w$ |
| 0 | 1 | 1 | 1 | $L_w$ |
| 1 | 0 | 0 | 0 | $U_p$ |
| 1 | 0 | 0 | 1 | R-$U_p$ |
| 1 | 0 | 1 | 0 | L-$U_p$ |
| 1 | 0 | 1 | 1 | $U_p$ |
| 1 | 1 | 0 | 0 | $U_p$-$L_w$ |
| 1 | 1 | 0 | 1 | R |
| 1 | 1 | 1 | 0 | L |
| 1 | 1 | 1 | 1 | None |

$U_p$: Upper Direction
$L_w$: Lower Direction
R: Right Direction
L: Left Direction

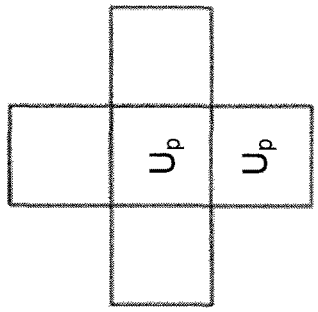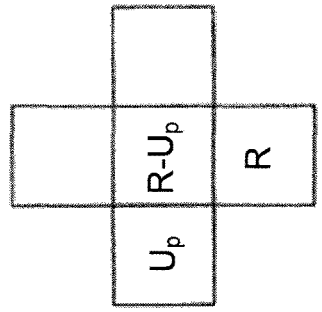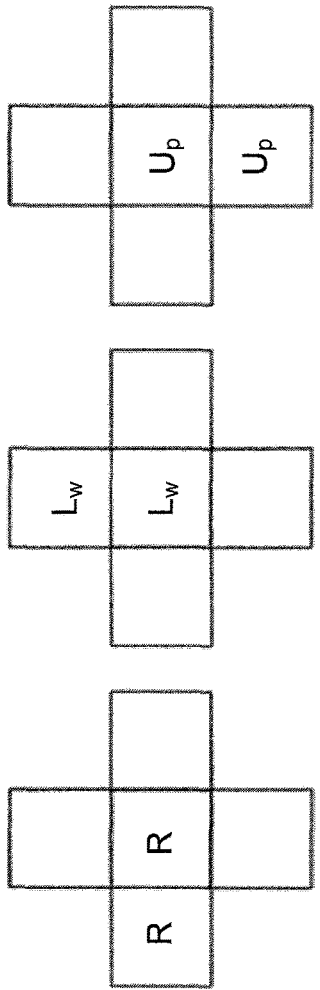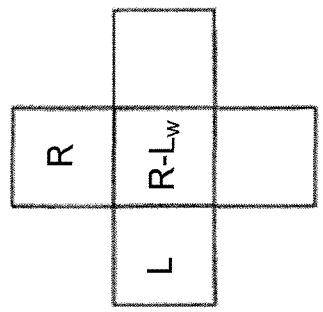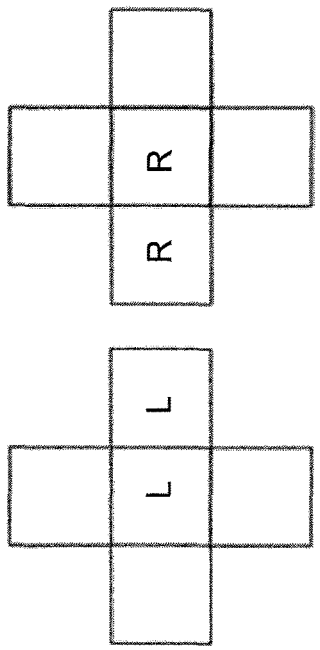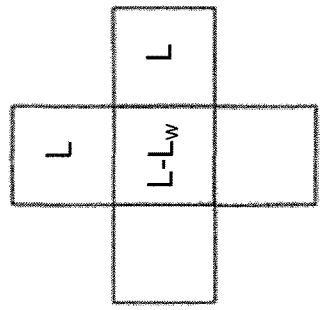

IMAGE FORMING APPARATUS

CROSS REFERENCE TO RELATED APPLICATIONS

This application claims priority under 35 USC 119 to Japanese Patent Application No. 2016-126215 filed on Jun. 27, 2016 original document, the entire contents which are incorporated herein by reference.

TECHNICAL FIELD

The present invention relates to an image forming apparatus for forming an image on a recording medium.

BACKGROUND

In an image forming apparatus, a so-called trapping process is often performed on image data in consideration of the deviation of the forming position when forming a plurality of color images having different colors from each other on a recording medium. For example, Patent Document 1 discloses an image forming apparatus for improving the image quality of the printed results by performing a trapping process.

RELATED ART

[Patent Doc. 1] JP Laid-Open Patent Publication 2008-141623

In an image forming apparatus, for example, a black developer is often used to realize a beautiful black color. Even in such a case, it is desired that the image quality is high.

It is desirable to provide an image forming apparatus capable of enhancing the image quality.

SUMMARY

An image forming apparatus disclosed in the application comprises an image processing part that performs a correction process to correct a first image data and a second image data, the first image data corresponding to a black developer and the second image data corresponding to a color developer that is other than the black developer, and an image forming part that respectively forms a first image and a second image on a recording medium based on the first image data and the second image data that are corrected by the image processing part, the first image and the second image adjoining. Wherein at a boundary of the first and second images, the first image has a first edge portion and the second image has a second edge portion, the first and second edge portions being arranged along the boundary, when a first image width of the first image data is narrower than a predetermined width, the first image width being defined as a length determined from one portion of the first edge portion, the image processing part performs the correction process by selectively moving one of the first edge portion and the second edge portion based on a pixel value of the first image, and the image processing part obtains a degree of blackness of the first image based on the pixel value of the first image, when the degree of blackness is higher than a predetermined value, the image processing part performs the correction process by moving the second edge portion such that an image area of the second image data becomes larger.

According to the image forming apparatus in one embodiment of the present invention, in a case in which the first image width is narrower than the predetermined width, since one or both of the first edge portion and the second edge portion are configured to be selectively moved based on the pixel value in the first image, the image quality can be enhanced.

BRIEF DESCRIPTION OF THE DRAWINGS

FIG. 4E is the explanatory view of FIG. 4B illustrating edge direction data.

FIG. 5 is a table showing one example of an edge detection process shown in FIG. 2.

FIG. 6(a) to FIG. 6(h) are explanatory views showing one example of the edge detection process shown in FIG. 2.

DETAILED DESCRIPTION OF THE PREFERRED EMBODIMENTS

Hereinafter, embodiments of the present invention will be described in detail with reference to drawings.

[Configuration Example]

Figure 1:
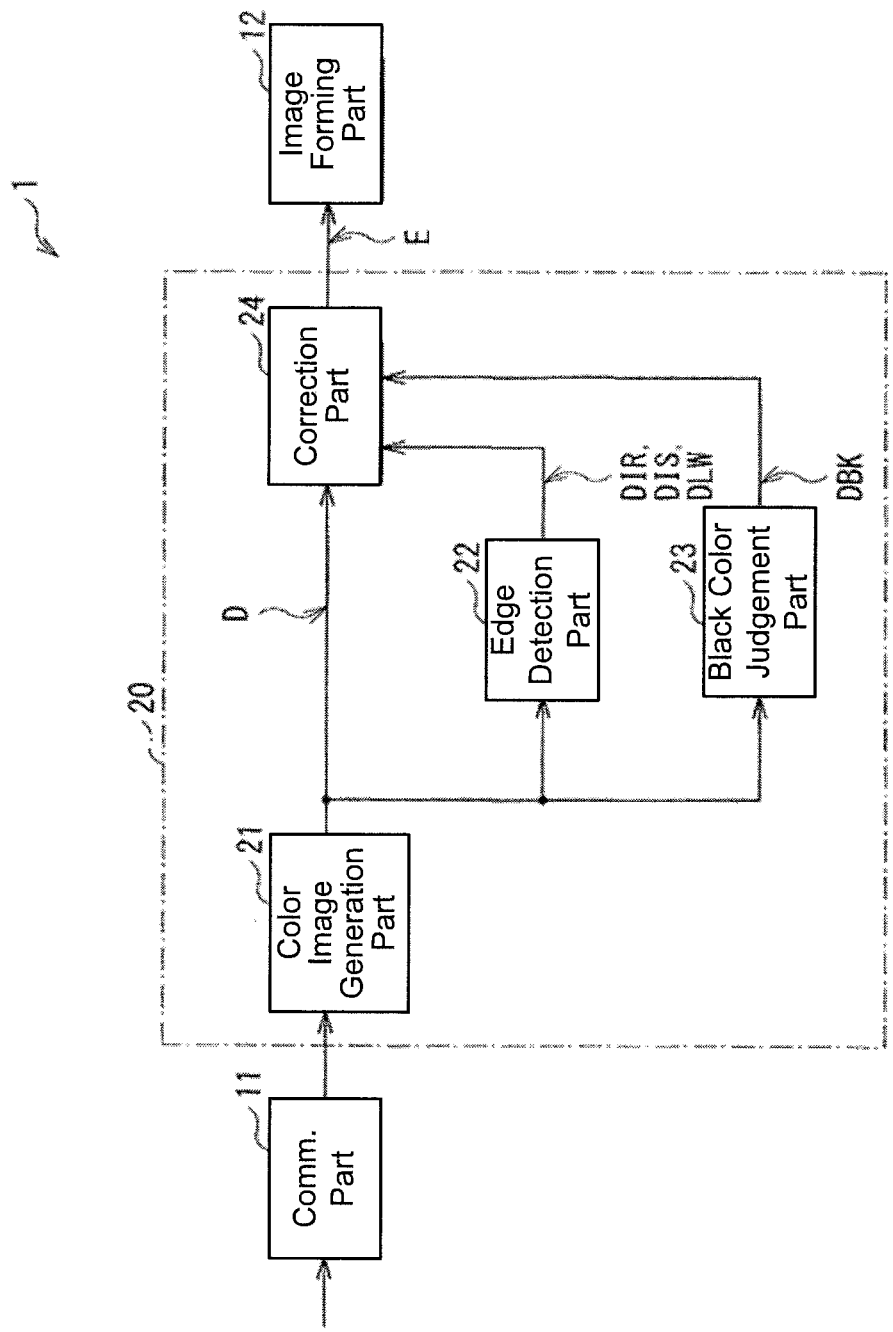
FIG. 1 is a block diagram showing one configuration example of an image forming apparatus according to one embodiment of the present invention.

FIG. 1 shows one configuration example of an image forming apparatus (image forming apparatus 1) according to one embodiment of the present invention. The image forming apparatus 1 is configured to function as a printer that forms images on a recording medium 9 such as, e.g., a plain paper, using a plurality of developers including a black developer. The image forming apparatus 1 is equipped with a communication part 11, an image processing part 20, and an image forming part 12.

The communication part 11, for example, receives print data DP by communicating with a host computer (not shown) via a cabled LAN (Local Area Network). Further, the communication part 11 is configured to supply the received print data DP to the image processing part 20. Although a cabled LAN is used in this example, the present invention is not limited to this. For example, in place of it, a wireless LAN, may be used. In addition, although a network is used in this example, the present invention is not limited to this. For example, in place of it, a USB (Universal Serial Bus) may be used.

The image processing part 20 generates four color image data D (color image data DY, DM, DC, DK) based on the print data DP and performs a trapping process on each color image data D. The image processing part 20, for example, may be constituted by a hardware or may be constituted by using a processor (or CPU) capable of executing a program. The image processing part 20 is equipped with a color image generation part 21, an edge detection part 22, a black color judgment part 23, and a correction part 24.

The color image generation part 21 is configured to generate four color image data D (color image data DY, DM, DC, DK) based on the print data DP. The color image data DY is image data corresponding to an image to be formed using a yellow developer, the color image data DM is image data corresponding to an image to be formed using a magenta developer, the color image data DC is image data corresponding to an image to be formed using a cyan color developer, and the color image data DK is image data corresponding to an image to be formed using a black developer.

The edge detection part 22 is configured to detect the edges of an image based on the four color image data D. Specifically, as described later, the edge detection part 22 is configured to generate four edge direction data DIR showing a map of edge direction information, four edge distance data DIS showing a map of edge distance information, and four width data DLW showing a map of width information based on the four color image data D.

The black color judgment part 23 judges whether or not each pixel is a black pixel based on the color image data DK of the four color image data D. Specifically, the black color judgment part 23 compares the pixel value of each pixel in the color image data DK with a predetermined threshold TH0, and when the degree of blackness indicated by the pixel value is higher than the degree of blackness indicated by threshold TH0, it is determined that the pixel is a black pixel. The black color judgment part 23 is configured to generate black color judgment data DBK showing a map of the judgment result based on the judgment result. In this example, it is determined whether or not each pixel is a black pixel based on the color image data DK of the four color image data D. However, the present invention is not limited to this, and in addition, for example, it may be judged whether or not each pixel is a black pixel based on four color image data D. Specifically, for example, it may be judged whether or not each pixel is a black pixel by determining the degree of blackness of each pixel based on the four color image data D and comparing the obtained degree of blackness with a threshold TH0.

The correction part 24 is configured to generate four color image data E (color image data EY, EM, EC, EK) by performing a correction process (trapping process) on the four color image data D (color image data DY, DM, DC, DK) based on the four edge direction data DIR, the four edge distance data DIS, the four width data DLW and the black color judgment data DBK. Specifically, the correction part 24 is configured to generate the color image data EY by correcting the color image data DY, the color image data EM by correcting the color image data DM, and the color image data EC by correcting the color image data DC, and the color image data EK by correcting the color image data DK.

The image forming part 12 is configured to form an image on a recording medium 9 based on the four color image data E. The image forming part 12 forms an image on a recording medium 9 using four colors of developers, which are yellow, magenta, cyan, and black developers. Specifically, the image forming part 12 forms a yellow image using a yellow developer based on the color image data EY, forms a magenta image using a magenta developer based on the color image data EM, forms a cyan color image using a cyan developer based on the color image data EC, and forms a black image using a black developer based on the color image data EK. At that time, the image forming part 12 forms a black image, a cyan image, a magenta image, and a yellow image on the recording medium 9 in this order.

Here, the image processing part 20 corresponds to one specific example of an "image processing part" of the present invention. The image forming part 12 corresponds to one specific example of an "image forming part" of the present invention. The color image data DK corresponds to one specific example of "first image data" of the present invention. Any one of the color image data DY, DM, DC corresponds to one specific example of "second image data" of the present invention.

[Operation and Function]

Next, the operation and the function of the image forming apparatus 1 of the present embodiment will be described.

(Summary of General Operations)

First, with reference to FIG. 1, the summary of the general operations of the image forming apparatus 1 will be described. The communication part 11 receives print data DP by communicating with a host computer. The color image generation part 21 of the image processing part 20 generates four color image data D (color image data DY, DM, DC, DK) based on the print data DP. The edge detection part 22 detects the edges of the image based on the four color image data D. Specifically, based on the four color image data D, the edge detection part 22 generates four edge direction data DIR showing a map of the edge direction information, four edge distance data DIS showing a map of the edge distance information, and four width data DLW showing a map of the width information. The black color judgment part 23 judges whether or not each pixel is a black pixel based on the color image data DK of the four color image data D and generates a black color judgment data DBK showing a map of the judgment result based on the judgment result. The correction part 24, based on four edge direction data DIR, four edge distance data DIS, four width data DLW, and black color judgment data DBK, generates four color image data E (color image data EY, EM, EC, EK) by performing a correction process (trapping process) for four color image data D (color image data DY, DM, DC, DK). The image forming part 12 forms an image on a recording medium 9 based on the four color image data E.

(Detailed Operations)

Figure 2:
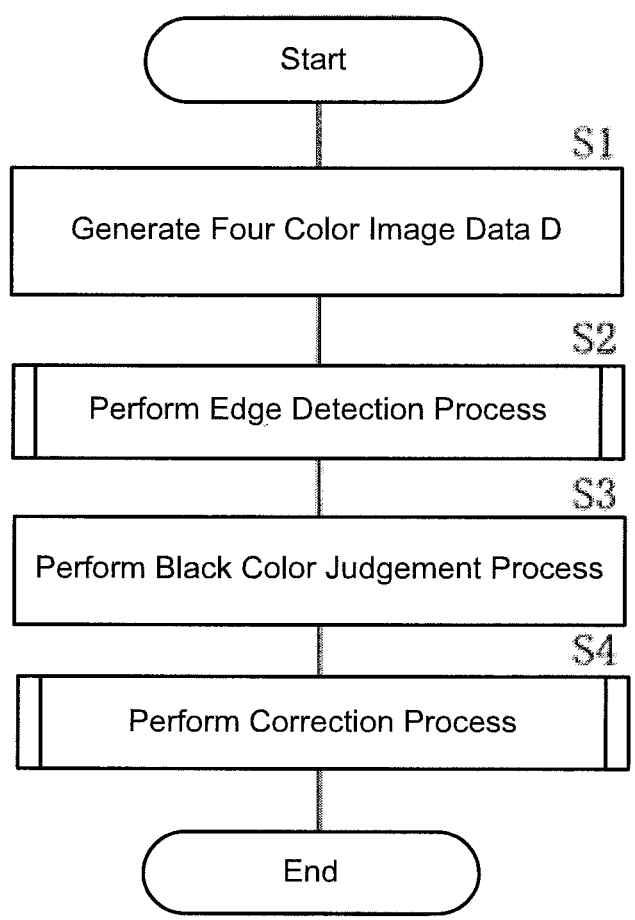
FIG. 2 is a flowchart showing one operational example of the image processing part shown in FIG. 1.

FIG. 2 shows one operational example of the image processing part 20. The image processing part 20 generates four color image data D (color image data DY, DM, DC, DK) based on the print data DP and performs a trapping process on each color image data D. This operation will be described below.

First, the color image generation part 21 generates four color image data D (color image data DY, DM, DC, DK) based on the print data DP received by the communication part 11 (Step S1).

Next, the edge detection part 22 performs an edge detection process on the four color image data D generated in Step 1 (Step S2). Specifically, as described later, the edge detection part 22 generates four edge direction data DIR showing a map of the edge direction information, four edge distance data DIS showing a map of the edge distance information, and four width information DLW showing a map of the width information based on the four color image data D.

Next, the black color judgment part 23 performs a black color judgment process based on the color image data DK of the four color image data D (Step S3). Specifically, the black color judgment part 23 judges whether or not each pixel is a black pixel by comparing the pixel value at each pixel in the color image data DK with a predetermined threshold TH0. Then, based on the judgment result, the black color judgment part 23 generates black color judgment data DBK showing a map of the judgment result.

Next, the correction part 24 performs a correction process on the four color image data D (Step S4). Specifically, as described later, the correction part 24 generates four color image data E (color image data EY, EM, EC, EK) by performing a trapping process on four color image data D (color image data DY, DM, DC, DK) based on the four edge direction data DIR, the four edge distance data DIS, the four width data DLW, and the black color judgment data DBK.

In this way, the image processing part 20 generates four color image data E. Then, the image forming part 12 forms an image on the recording medium 9 based on the four color image data E.

Next, the edge detection process at Step S2 and the correction process in Step S4 among the processes at Steps S1 to S4 will be described in detail.

(Edge Detection Process)

First, the edge detection process at Step S2 as shown in FIG. 2 will be explained in detail.

Figure 3:
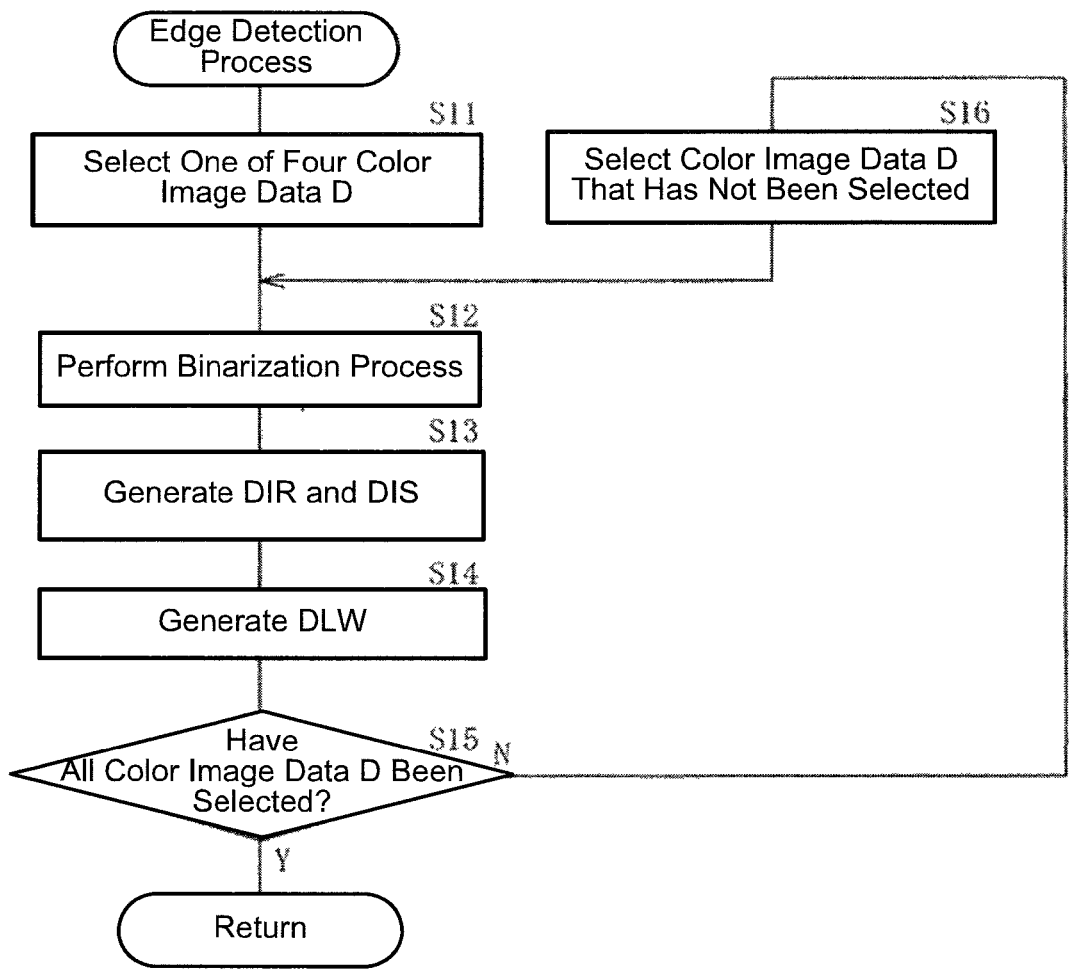
FIG. 3 is a flowchart showing one example of an edge detection process shown in FIG. 2.

FIG. 3 shows one example of an edge detection process. The edge detection process generates four edge direction data DIR, four edge distance data DIS, and four width data DLW based on four color image data D. This operation will be described in detail below.

First, the edge detection part 22 selects one of the four color image data D (color image data DY, DM, DC, DK) (Step S11).

Next, the edge detection part 22 performs a binarization process on the selected color image data D (Step S12). Specifically, the edge detection part 22 compares the pixel value of each pixel with a predetermined threshold TH1 in the selected color image data D. At this time, in the edge detection part 22, "1" is set when the pixel value is larger than the threshold TH1, and "0" is set when the pixel value is smaller than the threshold TH1.

Figures 4A, 4B:
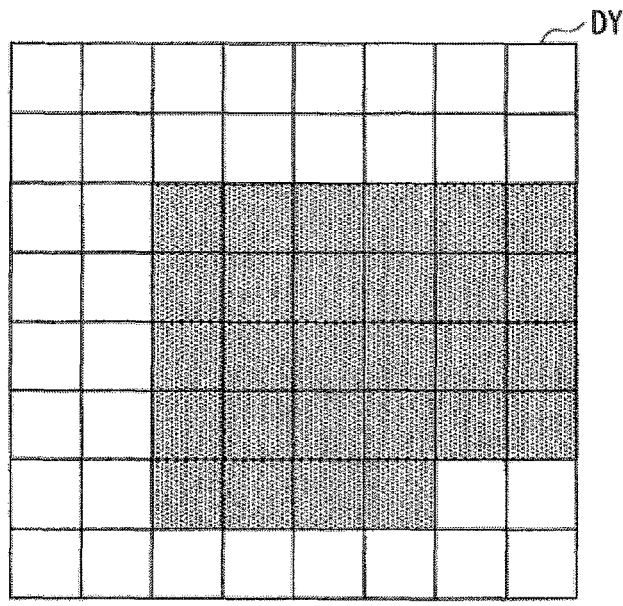
FIG. 4A is an explanatory view showing one example of a binarization process shown in FIG. 3.
FIG. 4B is another explanatory view showing one example of the binarization process shown in FIG. 3.

FIGS. 4A and 4B show one example of a binarization process for yellow color image data DY. FIG. 4A schematically shows a part of the color image data DY and FIG. 4B shows the result of the binarization process. The same applies to magenta color image data DM, cyan color image data DC, and black color image data DK. In FIG. 4A, the shaded pixel indicates the pixel in which the pixel value is larger than the threshold TH1, and the unshaded pixel indicates the pixel in which the pixel value is smaller than the threshold TH1. The edge detection part 22 performs the binarization process on such color image data DY to generate binary data DBN showing a map as shown in FIG. 4B. That is, the pixels indicated by "1" in FIG. 4B correspond to the shaded pixels in FIG. 4A. Similarly, the pixels indicated by "0" in FIG. 4B correspond to the unshaded pixels in FIG. 4A.

In this way, the edge detection part 22 generates binary data DBN by performing the binarization process on the selected color image data D.

Next, the edge detection part 22 generates edge direction data DIR and edge distance data DIS based on the binary data DBN generated at Step S12 (Step S13). This operation will be described in detail below.

First, the edge detection part 22 sequentially selects one of the plurality of pixels in which the value is "1" in the binary data DBN as a target pixel A. Then, the edge detection part 22 generates edge direction information of the target pixel A based on the value ("0" or "1") of the pixel above the target pixel A (upper pixel), the pixel below the target pixel A (lower pixel), the pixel on the left of the target pixel A (left pixel), and the pixel to the right of the target pixel A (right pixel).

FIG. 5 shows one example of an operation of generating the edge direction information of the target pixel A. In the edge detection part 22, for example, when the values of the upper pixel, the lower pixel, the left pixel, and the right pixel are "1", "0", "0", and "0", respectively, the edge direction information of the target pixel A is set as "upper". Similarly, in the edge detection part 22, for example, when the values of the upper pixel, the lower pixel, the left pixel, and the right pixel are "0", "1", "0", and "0", respectively, the edge direction information of the target pixel A is set as "lower", and the edge direction information of the target pixel A is set as "left" when the values are "0", "0", "1", and "0", respectively, and the edge direction information of the target pixel A is set as "right" when the values are "0", "0", "0", and "1", respectively. Further, for example, in the edge detection part 22, the edge direction information of the target pixel A is set as "upper and lower" when the values of the upper pixel, the lower pixel, the left pixel, and the right pixel are "1", "1", "0", and "0", respectively, the edge direction information of the target pixel A is set to "upper left" when "1", "0", "1", and "0", respectively, and the edge direction information of the target pixel A is set to "upper right" when the values are "1", "0", "0", and "1", respectively. Further, for example, in the edge detection part 22, the edge direction information of the target pixel A is set as "left" when the values of the upper pixel, the lower pixel, the left pixel, and the right pixel are "1", "1", "1", and "0", respectively, and the edge direction information of the target pixel A is set to "right" when the values are "1", "1", "0", and "1", respectively. Furthermore, for example, in the edge detection part 22, the edge direction information of the target pixel A is set as "none" when all of the values of the upper pixel, the lower pixel, the left pixel, and the right pixel are "1", and the edge direction information of the target pixel A is set as "upper, lower, left and right" when all of the values are "0".

With this, for example, the edge direction information of the outermost one-round of pixels in the region having a value of "1" in the binary data DBN is set to a value other than "none", and the edge direction information of the pixels surrounded by the one-round of pixels is set to "none".

Figure 4C:
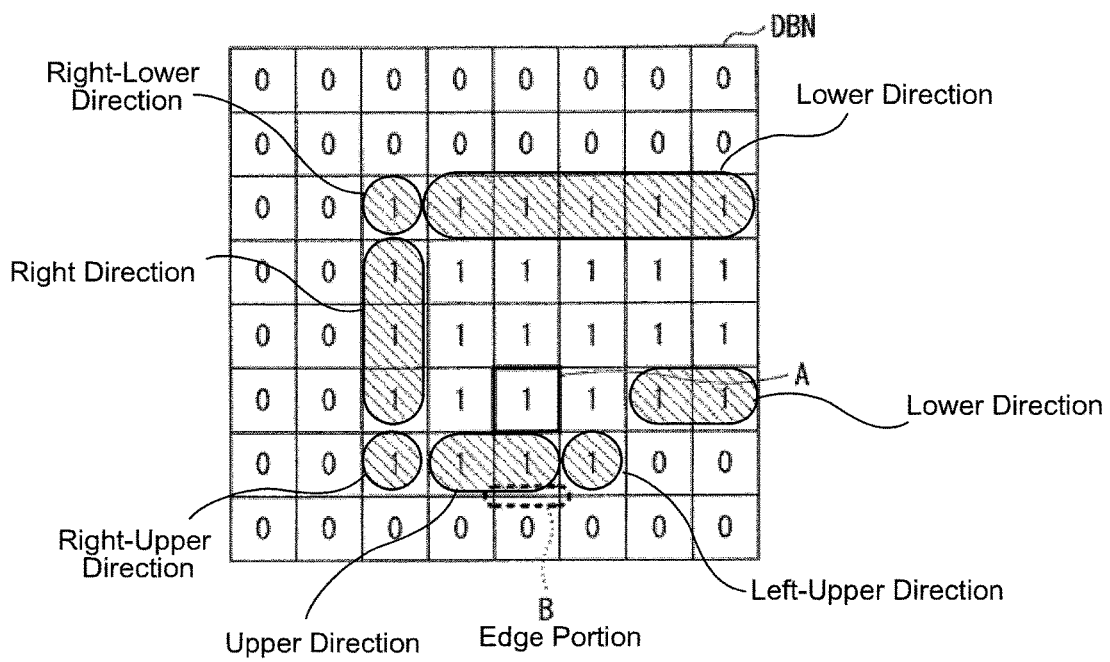
FIG. 4C is the explanatory view of FIG. 4B illustrating edge directions.

FIG. 4C illustrates edge directions. When the binary data DBN are arranged in the way of FIG. 4B, each of the outer pixels of which pixel value is 1 and which adjoins at least one pixel having zero has an edge direction information. These edge directions are shown in the figure.

Next, when the edge direction information of the target pixel A is other than "none", the edge detection part 22 sets the edge distance information of the target pixel A to "1". With this, the edge distance information of the outermost one-round of pixels in the region in which the value is "1" in the binary data DBN is generated.

Next, the edge detection part 22 sequentially selects one of the pixels in which the edge direction information is "none" as the target pixel A. Then, the edge detection part 22 generates the edge direction information of the target pixel A pixel based on the edge direction information of the pixel above the target pixel A (upper pixel), the pixel below the target pixel A (lower pixel), the pixel on the left of the target pixel A (left pixel), and the pixel on the right of the target pixel A (right pixel).

FIG. 6 [(a) to (h)] shows one example of an operation of generating the edge direction information of the target pixel A based on the edge direction information in the upper pixel, the lower pixel, the left pixel, and the right pixel. For example, as shown in FIG. 6(a), the edge detection part 22 sets the edge direction information of the target pixel A to "left" when "left" is included in the edge direction information of the right pixel. Specifically, for example, when the edge direction information of the right pixel is any one of "left", "upper left", "lower left", "left and right", "upper, lower, left, and right", the edge direction information of the target pixel A is set to "left". Also, in the edge detection part 22, as shown in FIG. 6(e), for example, when "left" is included in the edge direction information of the upper pixel and "lower" is included in the edge direction information of the right pixel, the edge direction information of the target pixel A is set to "lower left".

By repeating this process, in a region that is within the outer pixels of which the values in the binary data DBN are "1", the edge direction information is generated in order from the outside. Next, in the edge detection part 22, the edge distance information in a pixel, which is positioned one pixel inside from the outer pixel, in which edge direction information is generated when this process is performed once is set to "2", and the edge distance information in a pixel in which an edge direction information is generated when this process is performed twice is set to "3". The same process applies hereinafter. With this, the edge distance information is set to "1", "2", "3", . . . , in order from the outermost side in the region in which the value in the binary data DBN is "1".

For example, the edge direction information of the target pixel A shown in FIG. 4B is "upper", and the edge distance information of the target pixel A is "2". That is, the edge direction information and the edge distance information indicate that the target pixel A is "above" the nearest edge portion B and is at the "$2^{nd}$" pixel from the edge portion B.

In this manner, the edge direction information and the edge distance information are generated in all pixels in which the value in the binary data DBN is "1". Then, the edge detection part 22 generates the edge direction data DIR showing a map of the edge direction information based on the edge direction information of each pixel as well as the edge distance data DIS showing a map of the edge distance information based on the edge distance information of each pixel.

Figure 4D:
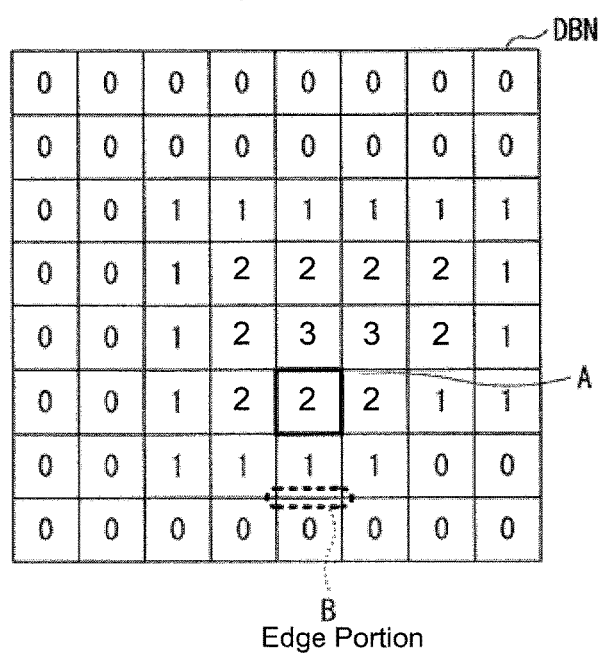
FIG. 4D is the explanatory view of FIG. 4B illustrating edge distance information.

The edge distance information and edge direction data are respectively shown in FIGS. 4D and 4E.

Next, the edge detection part 22 generates the width data DLW based on the edge direction data DIR and the edge distance data DIS generated at Step S13 (Step S14). Specifically, the edge detection part 22 sequentially selects one of the pixels in which the value is "1" in the binary data DBN as the target pixel A. Then, based on the edge direction information of the target pixel A, the edge detection part 22 examines how many pixels "1" of the binary data continues in the direction indicated by the edge direction information and in the direction opposite of the direction. For example, when the edge direction information of the target pixel A is "upper", "lower", or "upper and lower", the edge detection part 22 examines how many pixels "1" continues in the vertical direction of the target pixel A. Further, for example, when the edge direction information of the target pixel A is "left", "right", or "left and right", the edge detection part 22 examines how many pixels "1" continues in the horizontal direction of the target pixel A. Further, for example, when the edge direction information of the target pixel A is "upper right", "lower right", "upper left", or "lower left", the edge detection part 22 examines how many pixels "1" continues in the vertical direction and the horizontal direction of the target pixel A. Then, the edge detection part 22 sets the value obtained in this way as the width information of the target pixel A.

For example, the edge direction information of the target pixel A shown in FIG. 4B is "upper", and the edge distance information of the target pixel A is "2". Therefore, the edge detection part 22 examines how many pixels "1" of the binary data continues in the vertical direction of the target pixel A. In this example, five "1"s continue in the vertical direction. Therefore, the edge detection part 22 sets the width information of the target pixel A to "5".

In this manner, the width information is generated for all pixels in which the value is "1" in the binary data DBN. Then, the edge detection part 22 generates a width data DLW showing a map of the width information based on the width information of each pixel.

Next, the edge detection part 22 checks whether or not all color image data D have been selected (Step S15). If all color image data D have not been selected yet ("N" at Step S15), color image data D which has not yet been selected is selected (Step S16) and the process returns to Step S12. Then, Steps S12 to S16 are repeated until all color image data D are selected. When all color image data D are selected ("Y" at Step S15), this edge detection process is finished.

(Correction Process)

Next, the correction process at Step S3 shown in FIG. 2 will be explained in detail.

Figure 7:
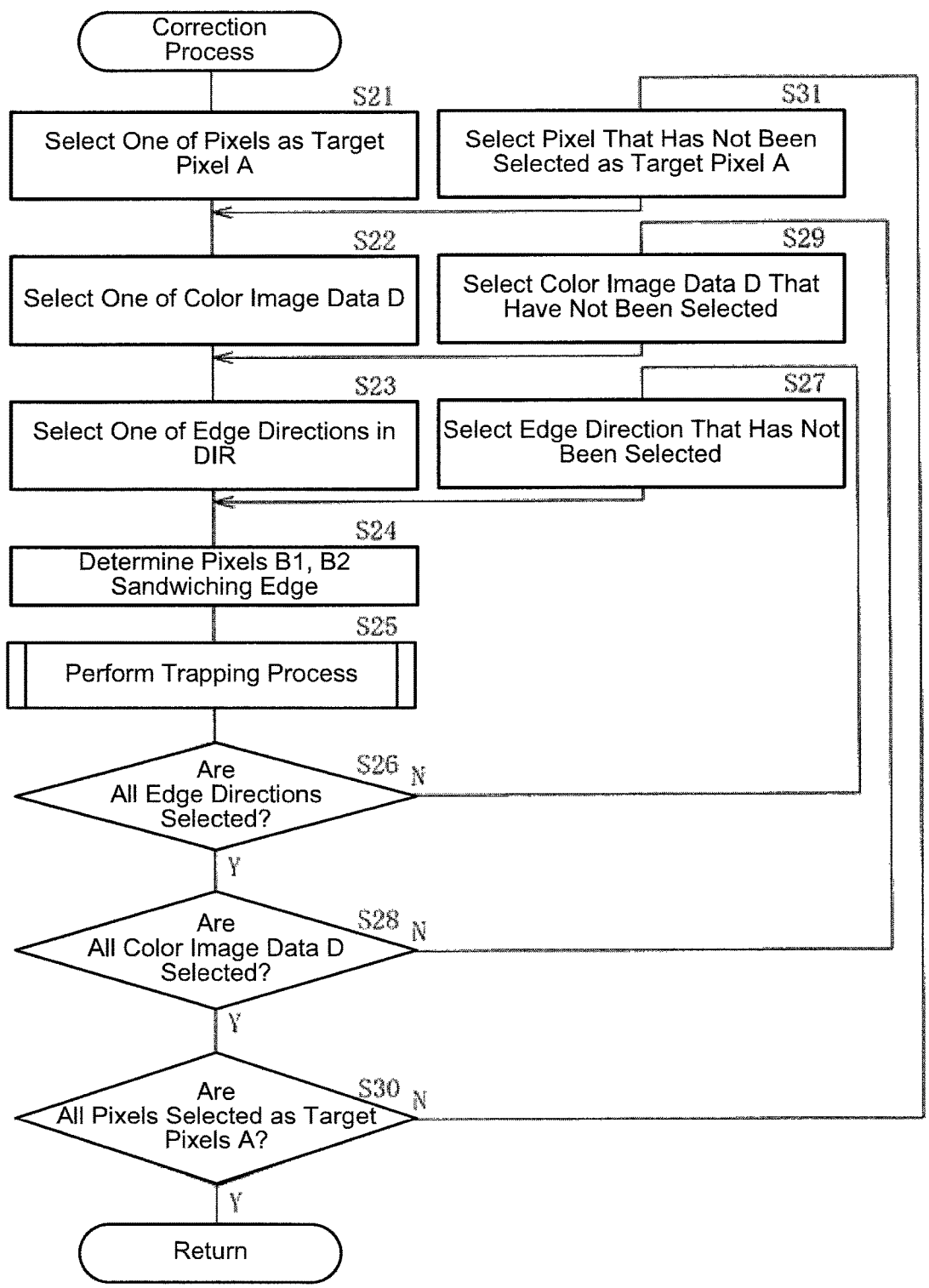
FIG. 7 is a flowchart showing one example of a correction process shown in FIG. 2.
Figure 8:
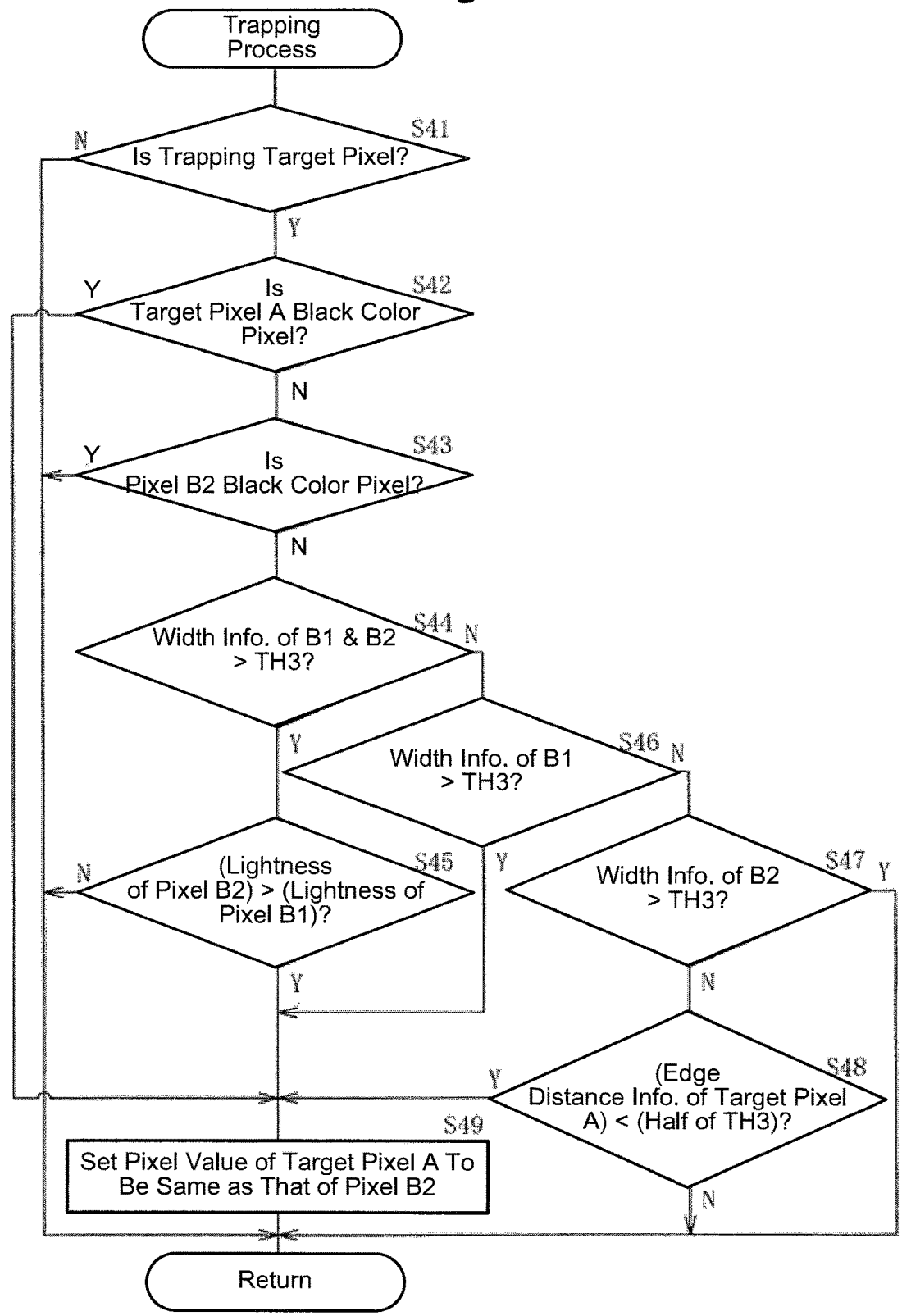
FIG. 8 is a flowchart showing one example of a trapping process shown in FIG. 7.

FIGS. 7 and 8 show an example of the correction process. In the correction process, a trapping process is performed on four color image data D based on four edge direction data DIR, four edge distance data DIS, four width data DLW, and black color judgment data DBK. Hereinafter, this operation will be described in detail.

First, the correction part 24 selects one of the pixels as the target pixel A (Step S21), and selects one of the four color image data D (Step S22). The correction part 24 selects one of the edge directions included in the edge direction information based on the edge direction information of the target pixel A in the edge direction data DIR of the selected color image data D (Step S23). That is, for example, when edge direction information is "upper left", one of them (for example, "left") is selected first.

Next, the correction part 24 determines two pixels B1 and B2 that sandwich the edge (Step S24).

Figure 9:
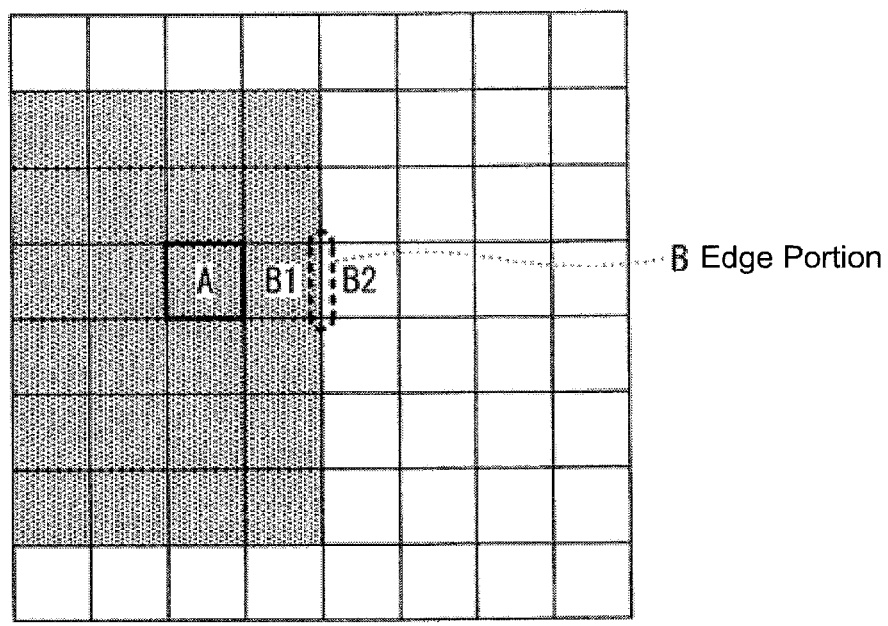
FIG. 9 is an explanatory view showing one example of the correction process shown in FIG. 2.

FIG. 9 shows one example of the determination operation of the pixels B1 and B2. FIG. 9 shows the binary data DBN of the selected color image data D, and the shaded pixel indicates a pixel having a value of "1" and the unshaded pixel indicates a pixel having a value of "0". In this example, the edge direction information of the target pixel A is "left", and the edge distance information of the target pixel A is "2". The correction part 24 identifies the edge portion B based on the edge direction information and the edge distance information. That is, the edge portion B is located between the pixel B1 on the near side located at a distance of 1 pixel from the target pixel A on the right of the target pixel A and the pixel B2 on the far side located at a distance of 2 pixels from the target pixel A on the right of the target pixel A. That is, the pixel B1 is positioned from the target pixel A at a distance corresponding to a value that is one less than the value indicated by the edge distance information in the direction opposite of the edge direction indicated by the edge direction information of the target pixel A, and the pixel B2 is positioned from the target pixel A at a distance corresponding to the value indicated by the edge distance information in the direction opposite of the edge direction indicated by the edge direction information.

In this way, the correction part 24 identifies the pixels B1 and B2 that sandwich the edge portion B based on the edge direction information and the edge distance information of the target pixel A.

Next, the correction part 24 performs a trapping process (Step S25).

First, as shown in FIG. 8, the correction part 24 checks whether or not the target pixel A in the selected color image data D is a trapping target pixel (Step S41). Specifically, the correction part 24 judges that the target pixel A is a trapping target pixel when the following two conditions are satisfied.

The first condition is that the value indicated by the edge distance information of the target pixel A is equal to or less than a predetermined threshold TH2 set in advance. That is, when this condition is satisfied, it is an indication that the target pixel A is close to the edge portion B in the selected color image data D. The threshold TH2 is set in advance according to the relative deviation amount of the forming position of each image when the image forming part 12 forms yellow, magenta, cyan, and black images on a recording medium 9, respectively. For example, when the deviation amount is 2 pixels, the threshold TH2 is set to "2". In this case, for example, when the value indicated by the edge distance information of the target pixel A is "2" or less, the first condition is satisfied, and when the value indicated by the edge distance information in the target pixel A is "3", the first condition is not satisfied.

The second condition is that, in pixels B1 and B2, "1" is included in the binary data DBN of different color image data D among color image data DY, DM, DC, DK. For example, when the pixel B1 has a magenta pixel value and the pixel B2 has a cyan pixel value, the second condition is satisfied. For example, when the pixel B1 has a magenta color pixel value and a cyan color pixel value, and the pixel B2 has a magenta color pixel value and a yellow pixel value, the second condition is not satisfied since both pixels B1 and B2 have the magenta pixel values.

The correction part 24 judges that the target pixel A is a trapping target pixel when these two conditions are satisfied. When the target pixel A is not a trapping target pixel ("N" at Step S41), the trapping process is finished.

At Step S41, when the target pixel A is a trapping target pixel ("Y" at Step S41), the correction part 24 checks whether or not the target pixel A is a black pixel based on the black color judgment data DBK (Step S42). When the target pixel A is a black pixel ("Y" at Step S42), the process proceeds to Step S49.

At Step S42, when the target pixel A is not a black pixel ("N" at Step S42), the correction part 24 checks whether or not the pixel B2 is a black pixel based on the black color judgment data DBK (Step S43). When the pixel B2 is a black pixel ("N" at Step S43), the trapping process is finished.

At Step S43, when the pixel B2 is not a black pixel ("N" at Step S43), the correction part 24 checks whether or not the width information in the pixels B1 and B2 are both larger than a predetermined threshold TH3 (Step S44). Specifically, for example, when the binary data DBN of magenta color image data DM includes "1" in pixel B1 and the binary data DBN of cyan color image data DC includes "1" in the pixel B2, the correction part 24 checks whether or not the width information of the pixel B1 in the width data DLW of the magenta color image data DM and the width information of the pixel B2 of the width data DLW of the cyan color image data DC are both greater than the threshold TH3.

At Step S44, when the width information in pixels B1 and B2 are both larger than the threshold TH3 ("Y" at Step S44), the correction part 24 checks whether or not the lightness in the pixel B2 is higher than the lightness in the pixel B1 (Step S45). Specifically, for example, when the binary data DBN of magenta color image data DM has "1" in the pixel B1 and the binary data DBN of cyan color image data DC has "1" in the pixel B2, the correction part 24 checks whether or not the lightness obtained from the pixel value of the pixel B2 of the cyan color image data DC is larger than the lightness obtained from the pixel value of the pixel B1 of the magenta color image data DM. Here, the lightness corresponds to one specific example of the "degree of brightness" in the present invention. When the lightness at the pixel B2 is higher than the lightness at the pixel B1 ("Y" at Step S45), the process proceeds to Step S49, and when the lightness at the pixel B2 is lower than the lightness at the pixel B1 ("N" at Step S45), the trapping process is finished.

At Step S44, when at least one of the width information in pixels B1 and B2 is smaller than the threshold TH3 ("N" at Step S44), the correction part 24 checks whether or not the width information in the pixel B1 is larger than the threshold TH3 (Step S46). When the width information in the pixel B1 is larger than the threshold TH3 ("Y" at Step S46), the process proceeds to Step S49.

At Step S46, when the width information of the pixel B1 is smaller than the threshold TH3 at Step S46 ("N" at Step S46), the correction part 24 checks whether or not the width information of the pixel B2 is larger than the threshold TH3 (Step S47). When the width information of the pixel B2 is larger than the threshold TH3 ("Y" at Step S47), the trapping process is terminated.

At Step S47, when the width information of the pixel B2 is smaller than the threshold TH3 ("N" at Step S47), the correction part 24 checks whether or not the edge distance information of the target pixel A is smaller than half of the threshold TH3 (Half of TH3) (Step S48). When the edge distance information of the target pixel A is smaller than half of the threshold TH3 ("Y" at Step S48), the process proceeds to Step S49, and when the edge distance information of the target pixel A is larger than half of the threshold TH3 ("N" at Step S48), the trapping process is finished.

Next, the correction part 24 sets the pixel value of the target pixel A to be the same as the pixel value of the pixel B2 (Step S49). Specifically, for example, when the binary data DBN of magenta color image data DM includes "1" in the pixel B1 and the binary data DBN of cyan color image data DC includes "1" in the pixel B2, the correction part 24 sets, for example, the pixel value of the target pixel A in the cyan color image data DC to the same value as the pixel value of the pixel B2 in the cyan color image data DC. With this, it is possible to widen the cyan image region.

The above completes the trapping process.

Next, as shown in FIG. 7, the correction part 24 checks whether or not all of the edge directions have been selected in the target pixel A in the selected color image data D (Step S26). When all of the edge directions have not been selected yet ("N" at Step S26), the correction part 24 selects an edge direction that has not been selected yet (Step S27) and returns to Step S24. Then, Steps S24 to S27 are repeated until all of the edge directions are selected. When all of the edge directions are selected ("Y" at Step S26), the process proceeds to Step S28.

Next, the correction part 24 checks whether or not all of the color image data D has been selected (Step S28). When all of the color image data D has not been selected yet ("N" at Step S28), the correction part 24 selects color image data D that has not been selected yet (Step S29) and returns to Step S23. Then, Steps S23 to S29 are repeated until all of the color image data D is selected. When all of the color image data D is selected ("Y" at Step S28), the process proceeds to Step S30.

Next, the correction part 24 checks whether or not all pixels have been selected as the target pixel A (Step S30). When all of the pixels has not been selected yet ("N" at Step S30), the correction part 24 selects one of the pixels that has not yet been selected as the target pixel A (Step S31) and returns to Step S22. Then, Steps S22 to S31 are repeated until all of the pixels are selected. When all of the pixels have been selected ("Y" at Step S30), the correction process is finished.

In this way, the correction part 24 generates four color image data E by making corrections on the four color image data D. Then, the image forming part 12 forms an image on the recording medium 9 based on the four color image data E.

Next, the operation of the image forming apparatus 1 will be described with a few examples in which an image is formed on the white recording medium 9.

(Specific Example E1)

Figure 10:
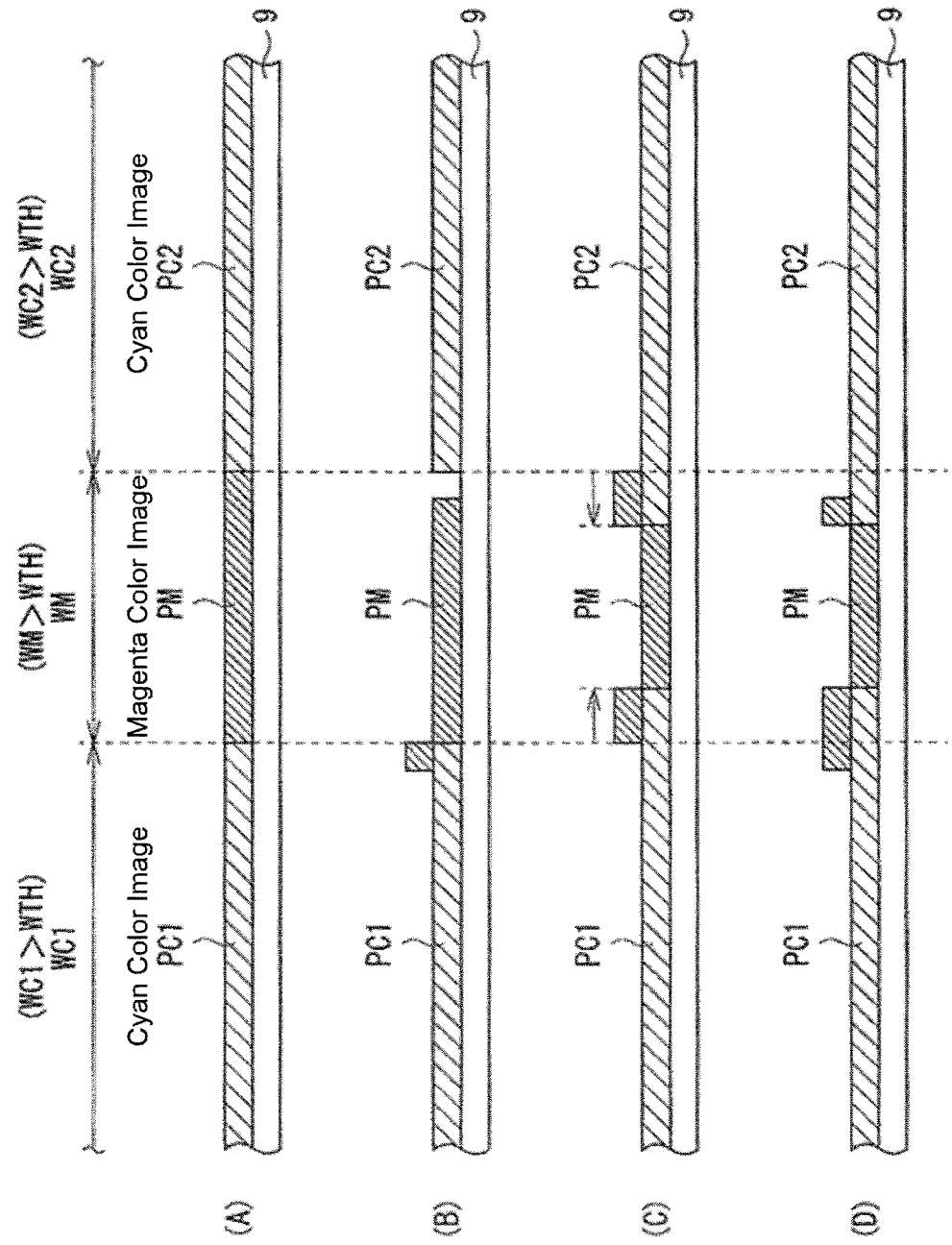
FIG. 10 is an explanatory view showing one operational example of the image forming apparatus shown in FIG. 1.

FIG. 10 schematically shows an example of an image formation when a magenta color image PM having low lightness and a cyan color image PC having high lightness are formed on a recording medium 9. (A) of FIG. 10 is a cross-sectional view in a case in which a trapping process is not performed, and (B) of FIG. 10 is a cross-sectional view in a case in which a relative deviation occurs in the forming position of the image in (A) of FIG. 10. (C) of FIG. 10 shows a cross-sectional view in a case in which a trapping process is performed, and (D) of FIG. 10 shows a cross-sectional view in a case in which a relative deviation occurs in the forming position of the image in (C) of FIG. 10. In this example, a cyan color image PC1 is formed on the left side of the magenta color image PM and a cyan color image PC2 is formed on the right side of the magenta color image PM. At that time, the width WM of the magenta color image PM and the width WC1 and WC2 of the cyan color images PC1 and PC2 in a case in which a trapping process is not performed are set to be wider than the width WTH corresponding to the threshold TH3.

As shown in (A) of FIG. 10, in a case in which a trapping process is not performed, the image forming apparatus 1, in this example, forms cyan color images PC (PC1, PC2) on a recording medium 9 and then forms a magenta color image PM. However, when the image forming part 12 forms the cyan color image PC and the magenta color image PM on the recording medium 9, when a relative deviation occurs in the forming position of these images, as shown in (B) of FIG. 10, a part of the surface of the white recording medium 9 is exposed.

Therefore, in the image forming apparatus 1, as shown in (C) of FIG. 10, the cyan color image PC having higher lightness than the lightness of the magenta color image PM is expanded by a trapping process. That is, when the magenta color image data DM is selected at Step S22, since the widths WM, WC1, and WC2 (or width information) are larger than the width WTH corresponding to the threshold TH3 ("Y" at Step S44), and the lightness of the cyan color image PC is higher than the lightness of the magenta color image PM, ("Y" at Step S45), the image forming apparatus 1 expands the cyan color image PC by correcting the cyan color image data DC at Step S49. Specifically, as shown (C) of FIG. 10, the image forming apparatus 1 moves the right edge of the cyan color image PC1 to the right and moves the left edge of the cyan color image PC2 to the left to expand the cyan color image PC.

With this, in the image forming apparatus 1, even if a relative deviation occurs in the forming position of an image when the image forming part 12 forms an image, as shown in (D) of FIG. 10, the risk of the exposure of the surface of the recording medium 9 can be reduced. As a result, in the image forming apparatus 1, the image quality can be enhanced.

Figure 11:
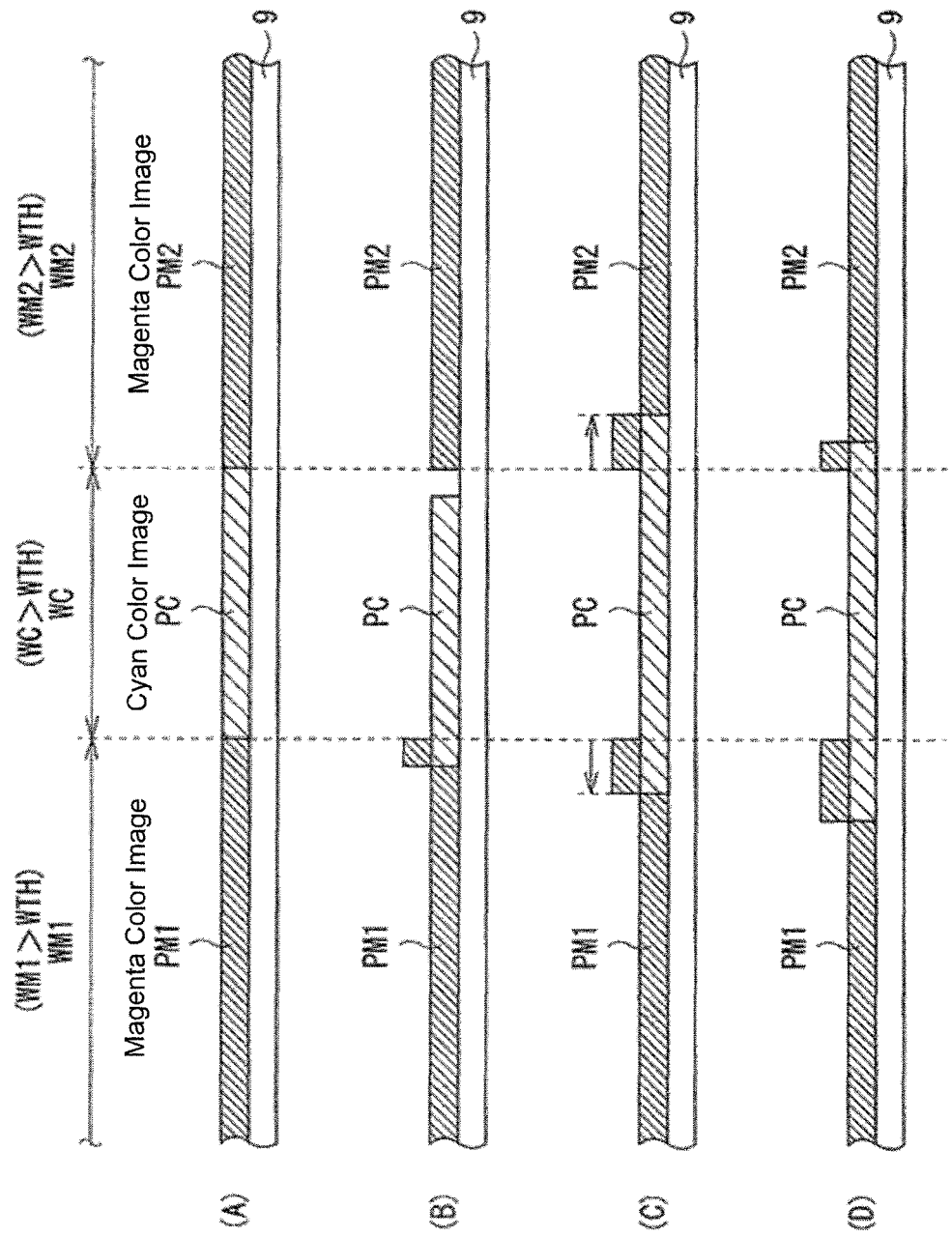
FIG. 11 is an explanatory view showing another operational example of the image forming apparatus shown in FIG. 1.

FIG. 11 shows an example of a case in which a magenta color image PM1 is formed on the left side of a cyan color image PC and a magenta color image PM2 is formed on the right side of a cyan color image PC. Even in this case, as shown in (C) of FIG. 11, the image forming apparatus 1 expands the cyan color image PC having higher lightness than the lightness of the magenta color image PM by the trapping process. Specifically, the image forming apparatus 1 expands the cyan color image PC by moving the left edge of the cyan color image PC to the left and moving the right edge of the cyan color image PC to the right. With this, in the image forming apparatus 1, when the image forming part 12 forms an image, even if a relative deviation occurs in the forming position of the image as shown in (D) of FIG. 11, the risk of exposure of the surface of the recording medium 9 can be reduced. As a result, in the image forming apparatus 1, the image quality can be enhanced.

In this example, an example in which a magenta color image PM having a low lightness and a cyan color image PC having high lightness are formed was explained, but the present invention is not limited to this, and the same applies to a case in which arbitrary two images among a magenta color image PM, a cyan color image PC, a yellow color image PY, and a black color image PK having a low degree of blackness are used. That is, in the image forming apparatus 1, the image quality can be enhanced by expanding the image with higher lightness between the two images in an opposite direction from the edge direction information.

(Specific Example E2)

Figure 12:
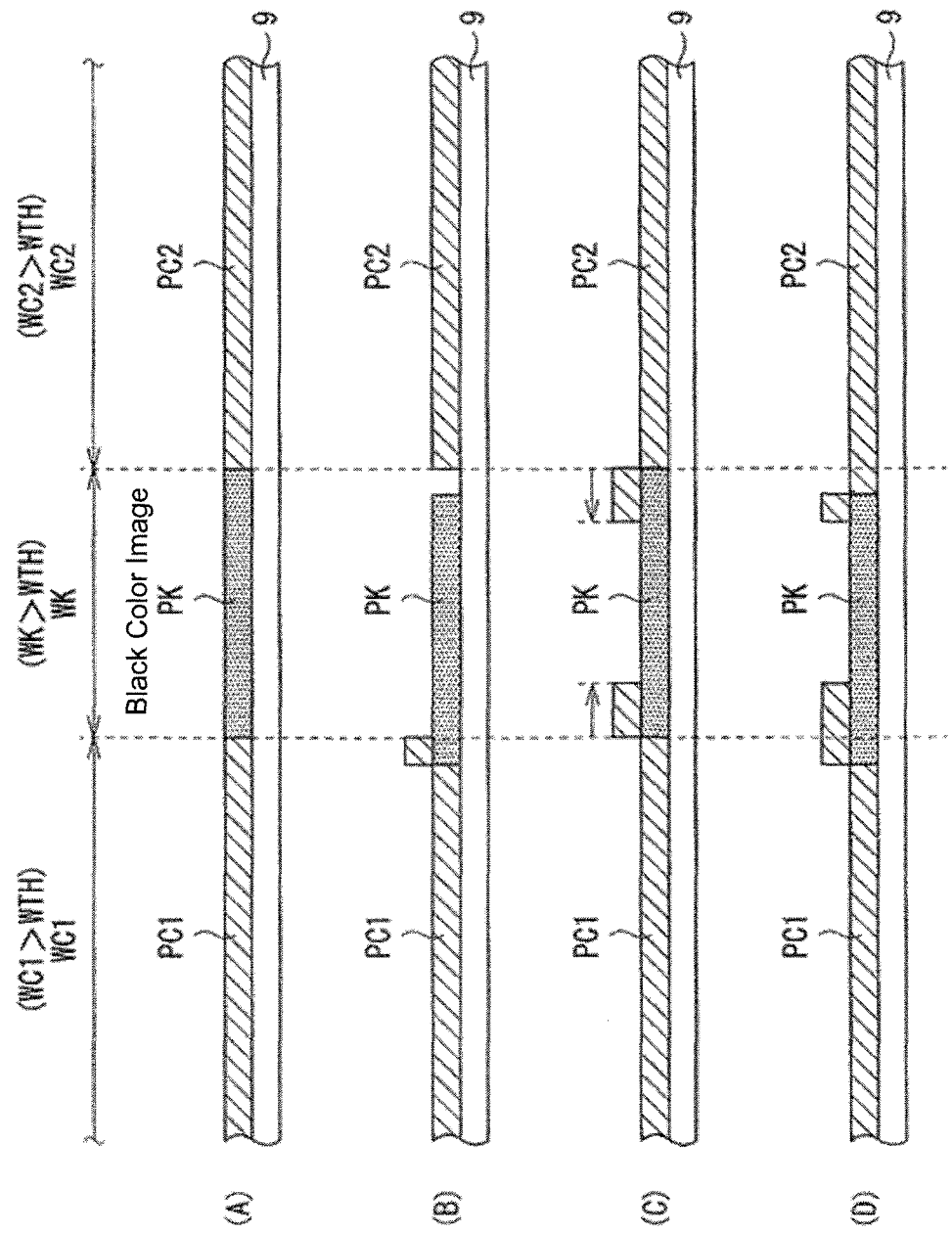
FIG. 12 is an explanatory view showing another operational example of the image forming apparatus shown in FIG. 1.

FIG. 12 schematically shows an example of image formation in a case in which a black color image PK having a high degree of blackness and a cyan color image PC are formed on a recording medium 9. In this example, a cyan color image PC1 is formed on the left side of the black color image PK and a cyan color image PC2 is formed on the right side of the black color image PK. At that time, the width WK of the black color image PK and the widths WC1, WC2 of the cyan color images PC1, PC2 in a case in which a trapping process is not performed are set to be larger than the width WTH corresponding to the threshold TH3.

Also in this case, when the image forming part 12 forms a black color image PK and a cyan color image PC on a recording medium 9, when a relative deviation occurs in the forming positions of these images, as shown in (B) of FIG. 12, a part of the surface of the white recording medium 9 is exposed.

Therefore, in the image forming apparatus 1, as shown in (C) of FIG. 12, the cyan color images PC adjacent to the black color image PK having a high degree of blackness is expanded by a trapping process. That is, when black color image data DK is selected at Step S22, since the target pixel A is a black pixel ("N" at Step S42), the image forming apparatus 1 corrects the cyan color image data DC at Step S49 to expand the cyan color images PC. Specifically, as shown in (C) of FIG. 12, the image forming apparatus 1 moves the right edge of the cyan color image PC1 to the right and moves the left edge of the cyan color image PC2 to the left to expand the cyan color images PC.

With this, in the image forming apparatus 1, when the image forming part 12 forms an image, even if a relative deviation occurs in the forming position of the image, as shown in (D) of FIG. 12, the risk of the exposure of the surface of the recording medium 9 can be reduced. As a result, in the image forming apparatus 1, the image quality can be enhanced.

Figure 13:
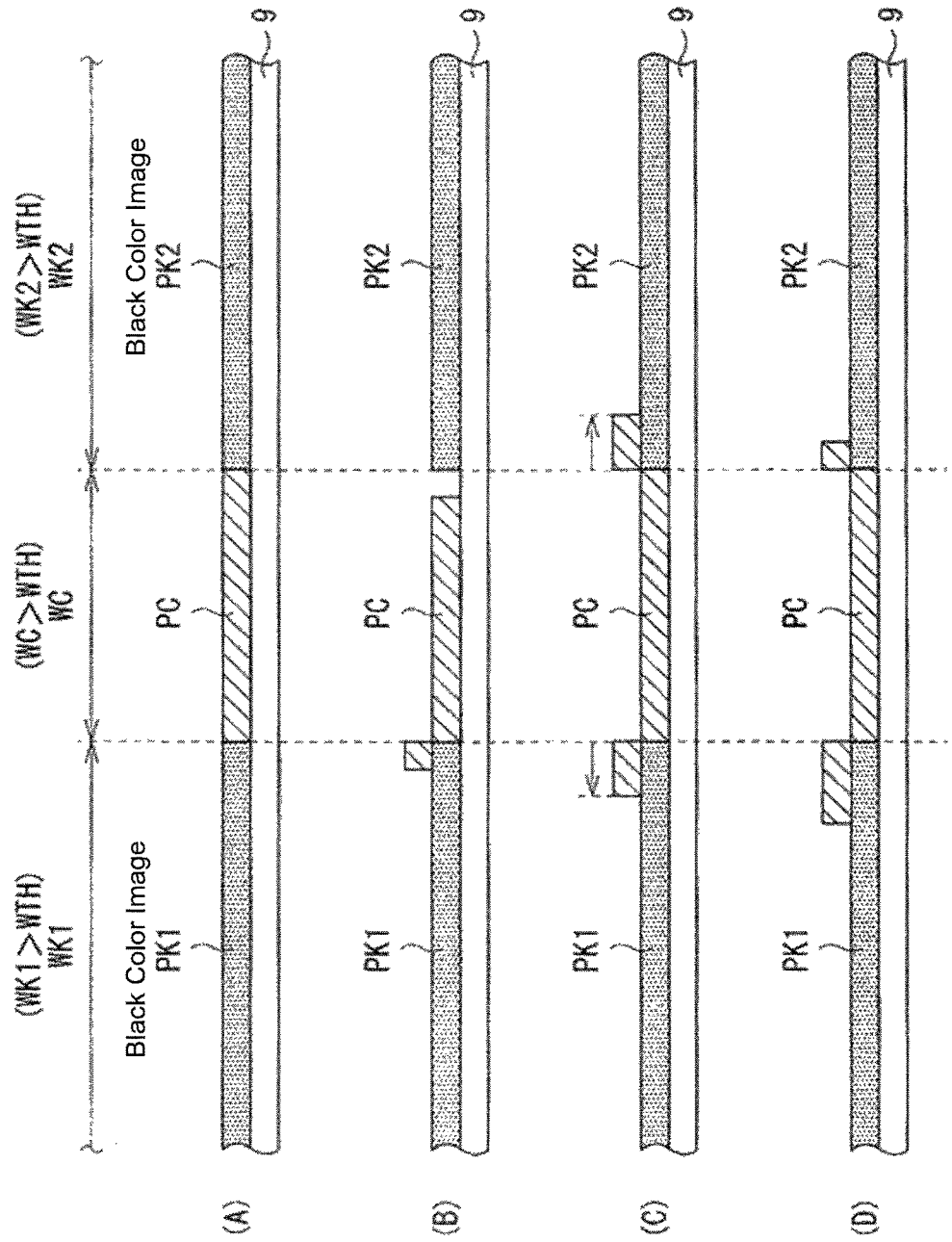
FIG. 13 is an explanatory view showing another operational example of the image forming apparatus shown in FIG. 1.

FIG. 13 shows an example in which a black color image PK1 is formed on the left side of a cyan color image PC and a black color image PK2 is formed on the right side of the cyan color image PC. Also in this case, as shown in (C) of FIG. 13, the image forming apparatus 1 expands the cyan color image PC adjacent to the black color images PK having a high degree of blackness by a trapping process. Specifically, the image forming apparatus 1 expands the cyan color image PC by moving the left edge of the cyan color image PC to the left and moving the right edge of the cyan color image PC to the right. With this, in the image forming apparatus 1, when the image forming part 12 forms an image, even if a relative deviation occurs in the forming position of the image, as shown in (D) of FIG. 13, the risk of the exposure of the surface of the recording medium 9 can be reduced. As a result, in the image forming apparatus 1, the image quality can be enhanced.

<Specific Example E3>

Figure 14:
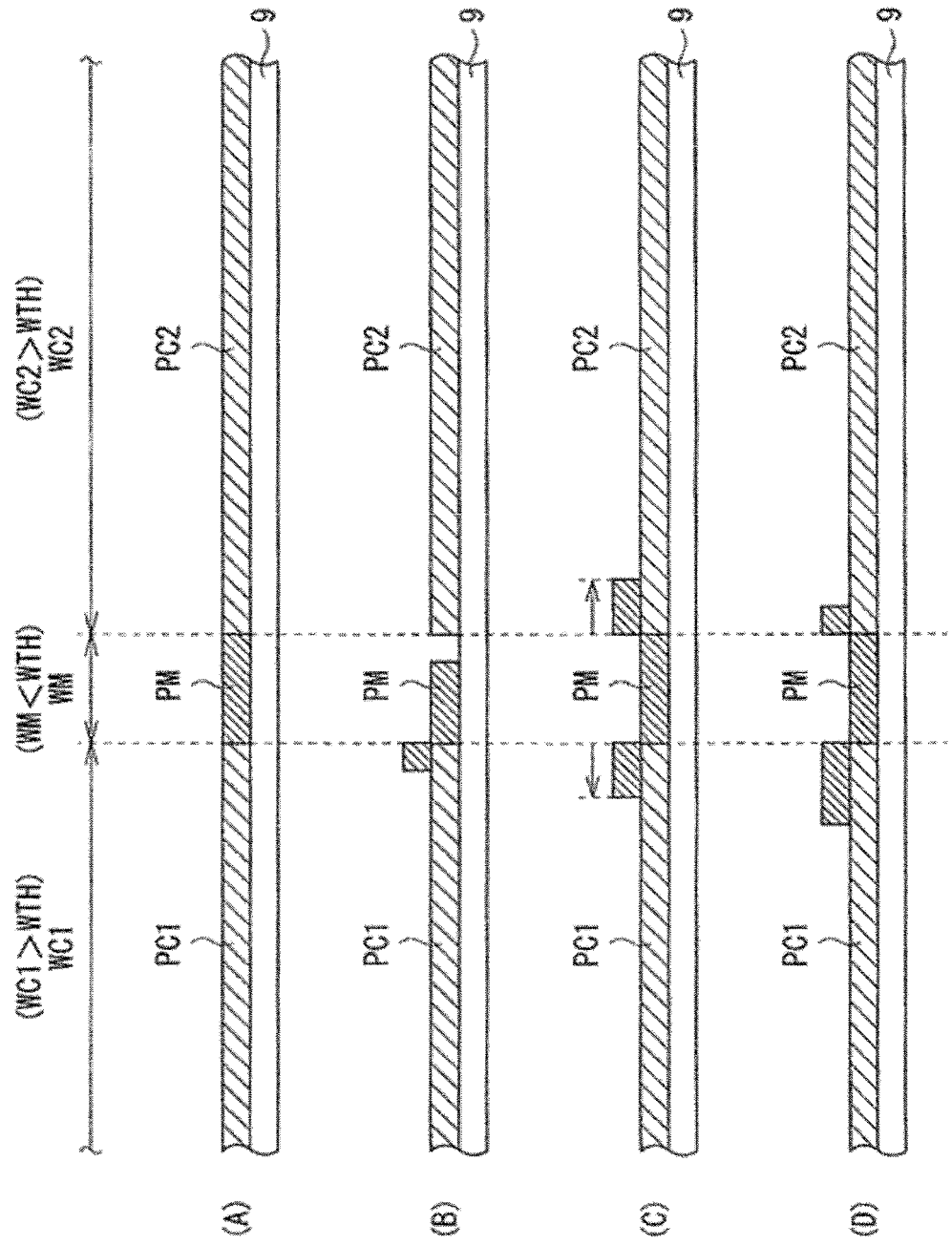
FIG. 14 is an explanatory view showing another operational example of the image forming apparatus shown in FIG. 1.
Figure 15:
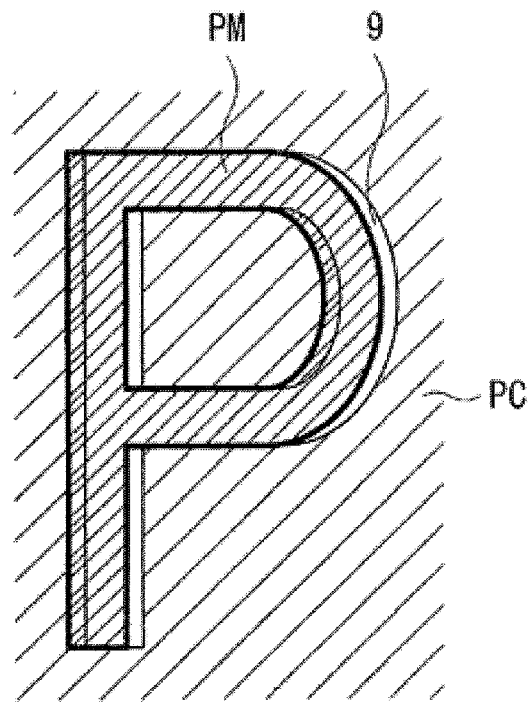
FIG. 15 is an explanatory view showing one example of an image formed by an image forming apparatus according to a comparative example.
Figure 16:
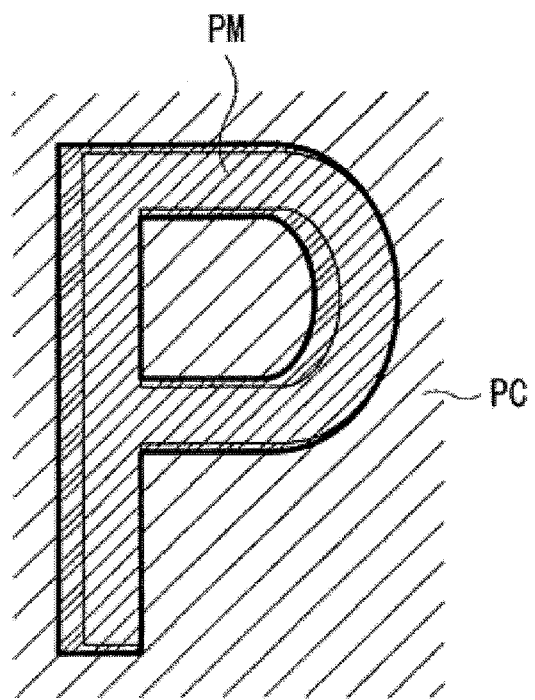
FIG. 16 is an explanatory view showing one example of an image formed by the image forming apparatus shown in FIG. 1.

FIGS. 14 to 16 schematically show examples of an image formation in a case in which a magenta color image PM having a low lightness and a cyan color image PC having a high lightness are formed on a recording medium 9. In this example, a cyan color image PC1 is formed on the left side of the magenta color image PM and a cyan color image PC2 is formed on the right side of the magenta color image PM. At that time, the width WM of the magenta color image PM in a case in which a trapping process is not performed is set to be narrower than the width WTH corresponding to the threshold TH3, and the widths WC1 and WC2 of the cyan color images PC1 and PC2 are set to be wider than the width WTH corresponding to the threshold TH3. FIG. 15 shows an example of an image formation in a case in which a trapping process is not performed, and FIG. 16 shows an example of an image formation in a case in which a trapping process is performed.

Also in this case, when the image forming part 12 forms the cyan color image PC and the magenta color image PM on a recording medium 9, when a relative deviation occurs in the forming position of these images, as shown in (B) of FIG. 14, a part of the surface of the white recording medium 9 is exposed. As a result, as shown in FIG. 15, the surface of the white recording medium 9 can be seen in a part of the boundary between the magenta color image PM and the cyan color image PC.

Figure 17:
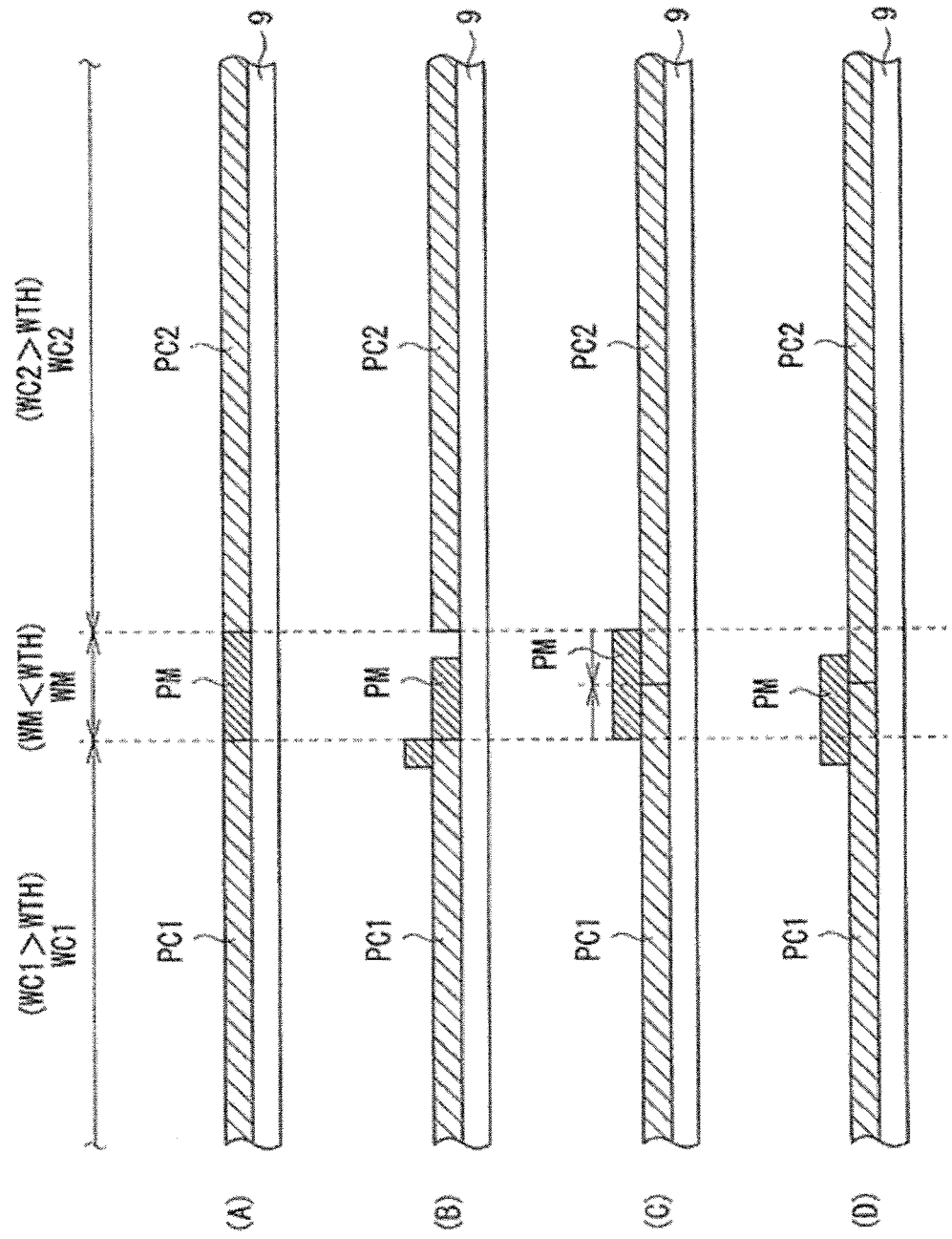
FIG. 17 is an explanatory view showing one operational example of an image forming apparatus according to a comparative example.
Figure 18:
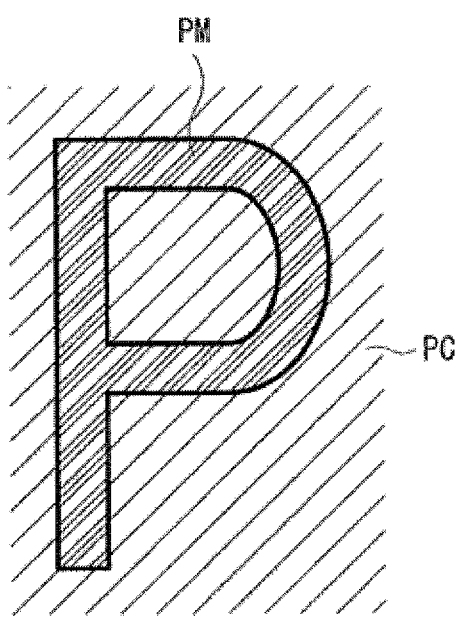
FIG. 18 is an explanatory view showing one example of another image formed by the image forming apparatus according to the comparative example.

As such a method of suppressing the exposure of the surface of a recording medium 9 as described above, similarly to the specific example E1 ((C) of FIG. 10), a method of expanding the cyan color image PC having a higher lightness than the lightness of the magenta color image PM can be considered. However, in this case, as shown in (C) of FIG. 17, since the width WM of the magenta color image PM is narrow, the area ratio of the region in the magenta color image PM region in which the cyan color image PC overlaps becomes high. As a result, as shown in FIG. 18, the color of the object (alphabet "P" in this example) becomes discolored, and the image quality may decrease.

Therefore, in the image forming apparatus 1, as shown in (C) of FIG. 14, the magenta color image PM having a narrow width WM is expanded by a trapping process. That is, when cyan color image data DC is selected at Step S22, since the width WM of the magenta color image PM is narrower than the width WTH corresponding to the threshold TH3, and the widths WC1, WC2 of the cyan color images PC1, PC2 are wider than the width WTH corresponding to the threshold TH3 ("N" at Step S44, "Y" at Step S46), at Step S49, the image forming apparatus 1 expands the magenta color image PM by correcting the magenta color image data DM. Specifically, as shown in (C) of FIG. 14, the image forming apparatus 1 moves the left edge of the magenta color image PM to the left and moves the right edge of the magenta color image PM to the right to expand the magenta color image PM.

With this, in the image forming apparatus 1, when the image forming part 12 forms an image, even if a relative deviation occurs in the forming position of the image, as shown in (D) of FIG. 14, the risk of the exposure of the surface of a recording medium 9 can be reduced, and it is also possible to lower the area ratio of the region in the region of the magenta color image PM having a narrow width in which the cyan color image PC overlaps. As a result, as shown in FIG. 16, it is possible to reduce the possibility that the recording medium 9 is visible in the vicinity of the object, and it is also possible to reduce the possibility that the color of the object becomes discolored, thereby improving the image quality.

Figure 19:
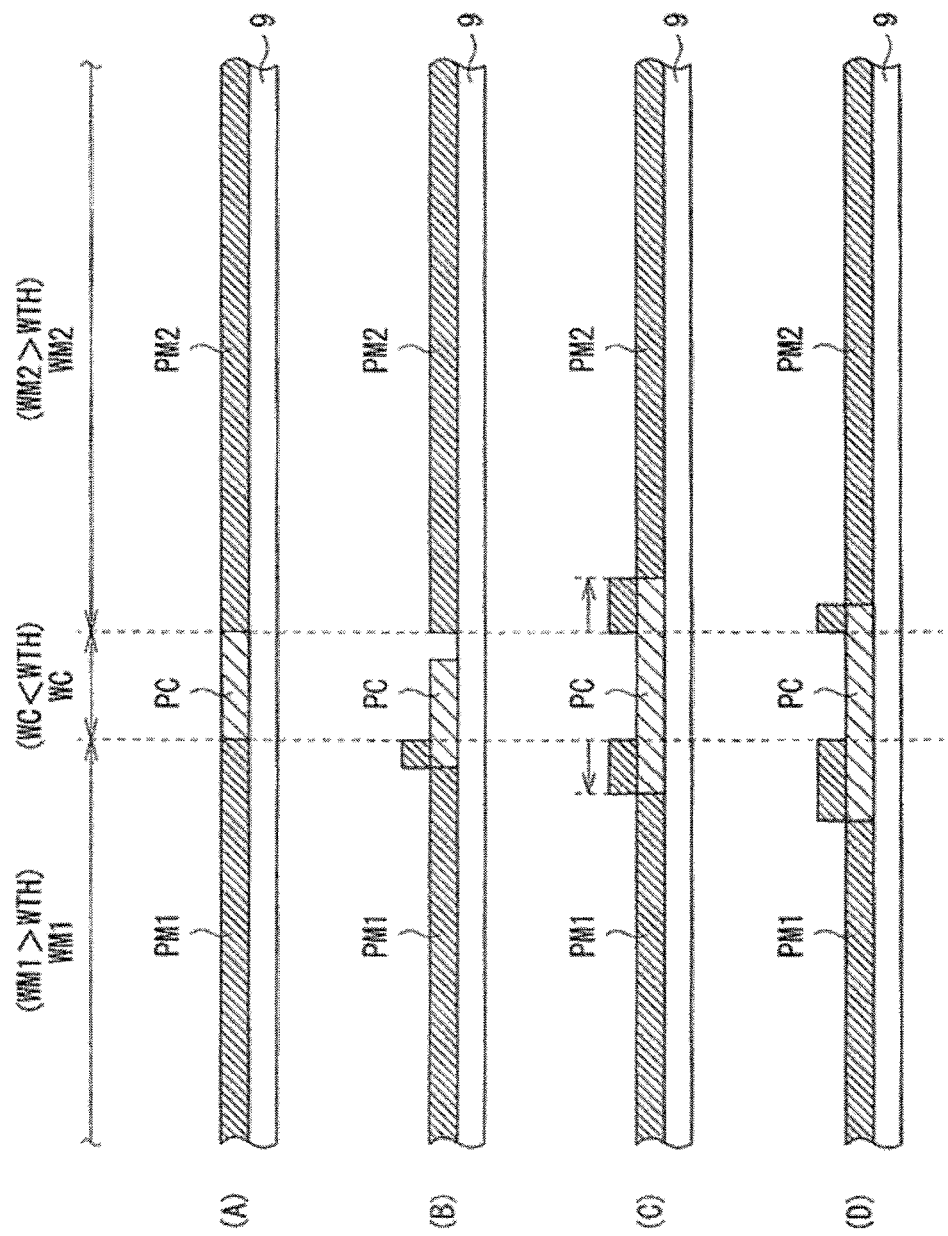
FIG. 19 is an explanatory view showing another operational example of the image forming apparatus shown in FIG. 1.

FIG. 19 shows an example in which a magenta color image PM1 is formed on the left side of a cyan color image PC and a magenta color image PM2 is formed on the right side of the cyan color image PC. Also in this case, as shown in (C) of FIG. 19, the image forming apparatus 1 expands the cyan color image PC having a narrow width WC by a trapping process. Specifically, the image forming apparatus 1 expands the cyan color image PC by moving the left edge of the cyan color image PC to the left and moving the right edge of the cyan color image PC to the right. With this, in the image forming apparatus 1, when the image forming part 12 forms an image, even if a relative deviation occurs in the forming position of the image, as shown in (D) of FIG. 19, the risk of the exposure of the surface of the recording medium 9 can be reduced, and it is also possible to lower the area ratio of a region in which the magenta color image PM overlaps in a region of the cyan color image PC having a narrow width. As a result, in the image forming apparatus 1, the image quality can be enhanced.

(Specific Example E4)

Figure 20:
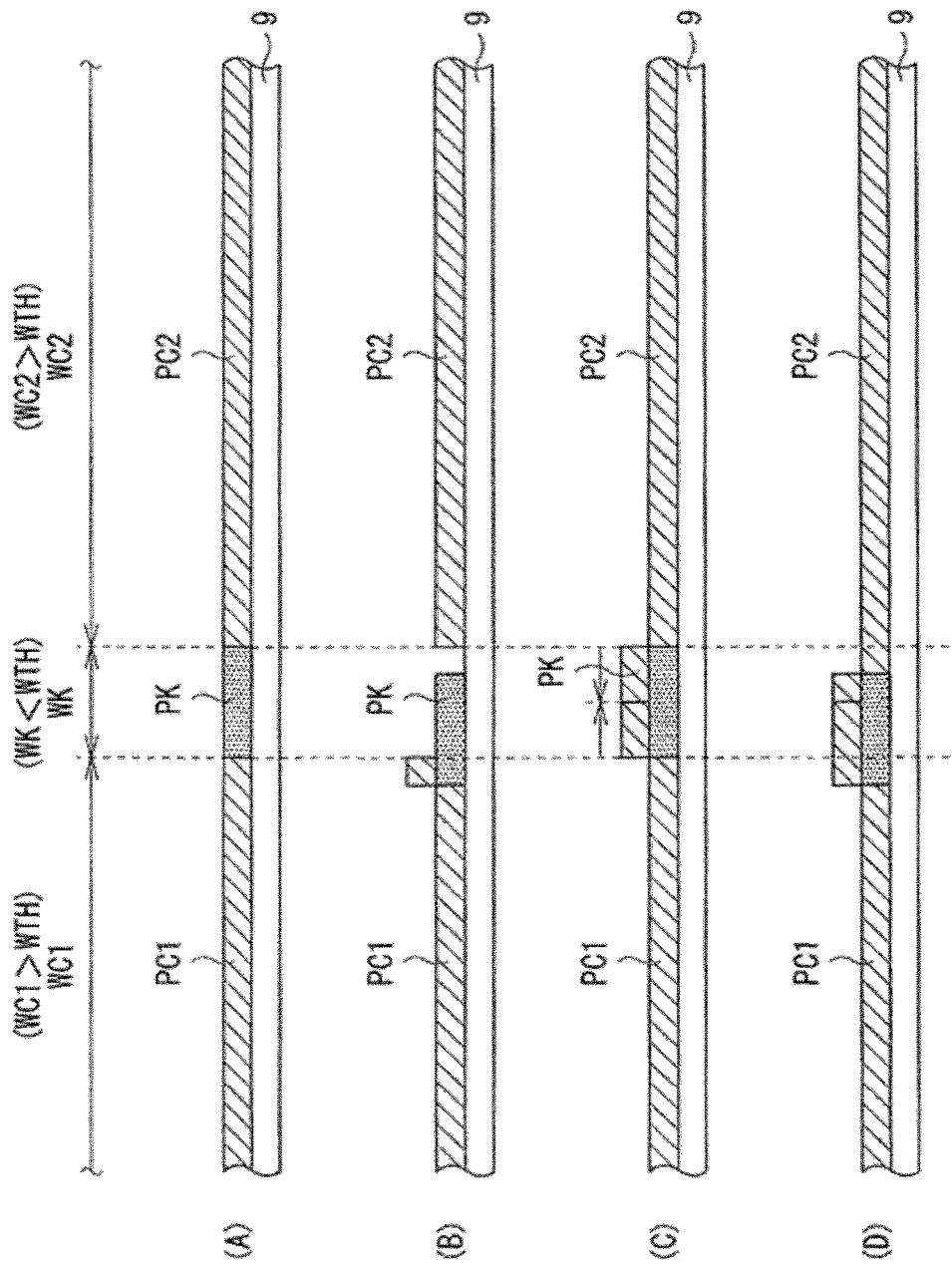
FIG. 20 is an explanatory view illustrating another operational example of the image forming apparatus shown in FIG. 1.
Figure 21:
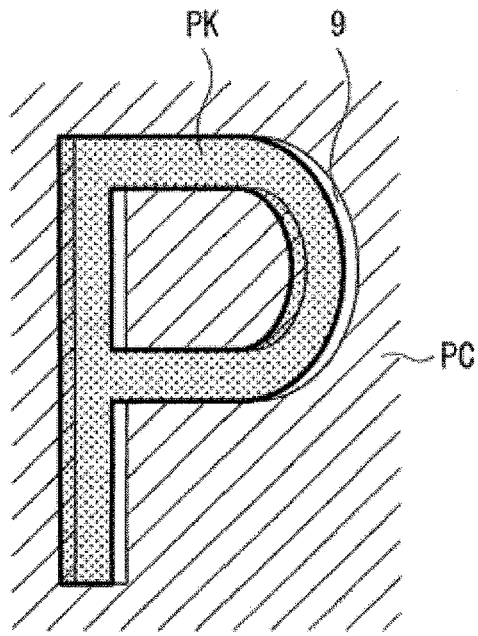
FIG. 21 is an explanatory view showing one example of another image formed by the image forming apparatus according to a comparative example.
Figure 22:
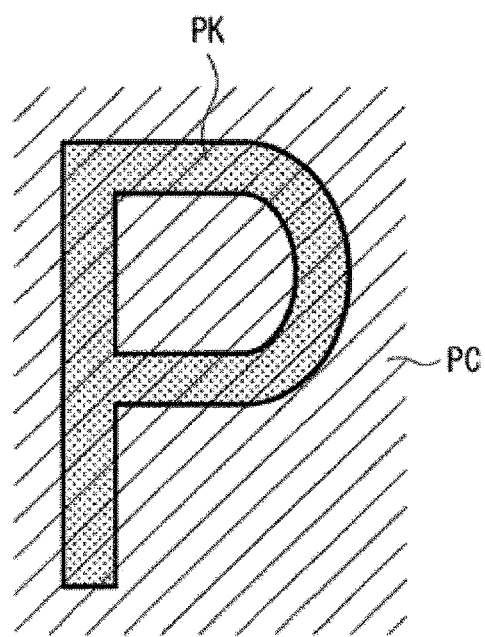
FIG. 22 is an explanatory view showing one example of another image formed by the image forming apparatus shown in FIG. 1.

FIGS. 20 to 22 schematically show an example of an image formation in a case in which a black color image PK having a high degree of blackness and a cyan color image PC are formed on a recording medium 9. In this example, a cyan color image PC1 is formed on the left side of the black color image PK and a cyan color image PC2 is formed on the right side of the black color image PK. At that time, the width WK of the black color image PK in a case in which a trapping process is not performed is set to be narrower than the width WTH corresponding to the threshold TH3, and the widths WC1 and WC2 of the cyan color images PC1 and PC2 are set to be wider than the width WTH corresponding to the threshold TH3. FIG. 21 shows an example of an image formation in a case in which a trapping process is not performed, and FIG. 22 shows an example of an image formation in a case in which a trapping process is performed.

Also in this case, when the image forming part 12 forms a black color image PK and a cyan color image PC on a recording medium 9, when a relative deviation occurs in the forming positions of these images, as shown in (B) of FIG. 20, a part of the surface of the recording medium 9 is exposed. As a result, as shown in FIG. 21, the surface of the white recording medium 9 is visible in a part of the boundary between the black color image PK and the cyan color image PC.

Figure 23:
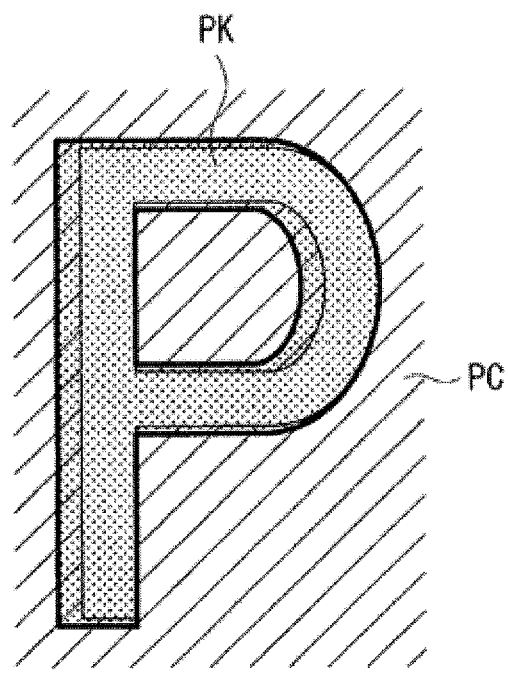
FIG. 23 is an explanatory view showing one example of another image formed by the image forming apparatus according to the comparative example.

As a method of suppressing such an exposure of the surface of the recording medium 9, a method of expanding the black color image PK having a narrow width WK can be considered similarly to the specific example E3 ((C) of FIG. 14). However, in this case, as shown in FIG. 23, the object (in this example, the alphabet "P") appears thick. That is, in this example, unlike the case of the specific example E3 (FIG. 16), since the color of the object is black, the widened black color image PK stands out and the object appears thick.

Therefore, in the image forming apparatus 1, as shown in (C) of FIG. 20, the cyan color image PC adjacent to the black color image PK having a high degree of blackness is expanded by a trapping process. That is, when black color image data DK is selected at Step S22, since the target pixel A is a black pixel ("N" at Step S42), the image forming apparatus 1 corrects the cyan color image data DC at Step S49 to expand the cyan color image PC. Specifically, as shown in (C) of FIG. 20, the image forming apparatus 1 moves the right edge of the cyan color image PC1 to the right and moves the left edge of the cyan color image PC2 to the left to expand the cyan color image PC.

With this, in the image forming apparatus 1, when the image forming part 12 forms an image, even if a relative deviation occurs in the forming position of the image, as shown in (D) of FIG. 20, the risk of the exposure of the surface of the recording medium 9 can be reduced, and the width of the black color image PK can be maintained. As a result, as shown in FIG. 22, it is possible to reduce the possibility that the object stands out and the possibility that the recording medium 9 is visible in the vicinity of the object can be reduced, and the image quality can be enhanced.

Figure 24:
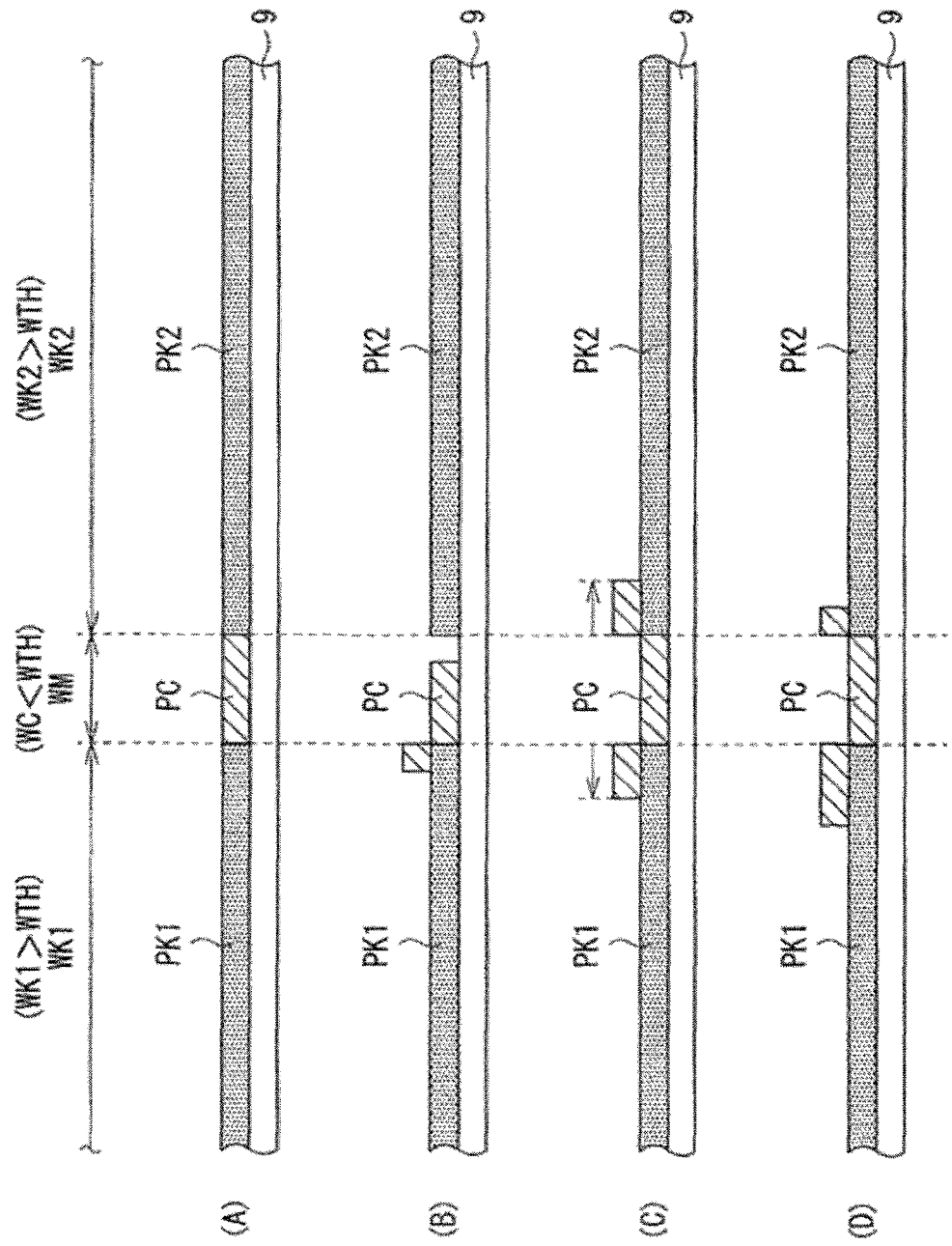
FIG. 24 is an explanatory view showing another operational example of the image forming apparatus shown in FIG. 1.

FIG. 24 shows an example in which a black color image PK1 is formed on the left side of a cyan color image PC and a black color image PK2 is formed on the right side of a cyan color image PC. Also in this case, as shown in (C) of FIG. 24, the image forming apparatus 1 expands the cyan color image PC adjacent to the black color image PK having a high degree of blackness by a trapping process. Specifically, the image forming apparatus 1 expands the cyan color image PC by moving the left edge of the cyan color image PC to the left and moving the right edge of the cyan color image PC to the right. With this, in the image forming apparatus 1, when the image forming part 12 forms an image, even if there is a relative deviation in the forming position of the image, as shown in (D) of FIG. 24, the risk of the exposure of the surface of the recording medium 9 can be reduced and the width of the cyan color image PC can be maintained. As a result, in the image forming apparatus 1, the image quality can be enhanced.

(Specific Example E5)

Figure 25:
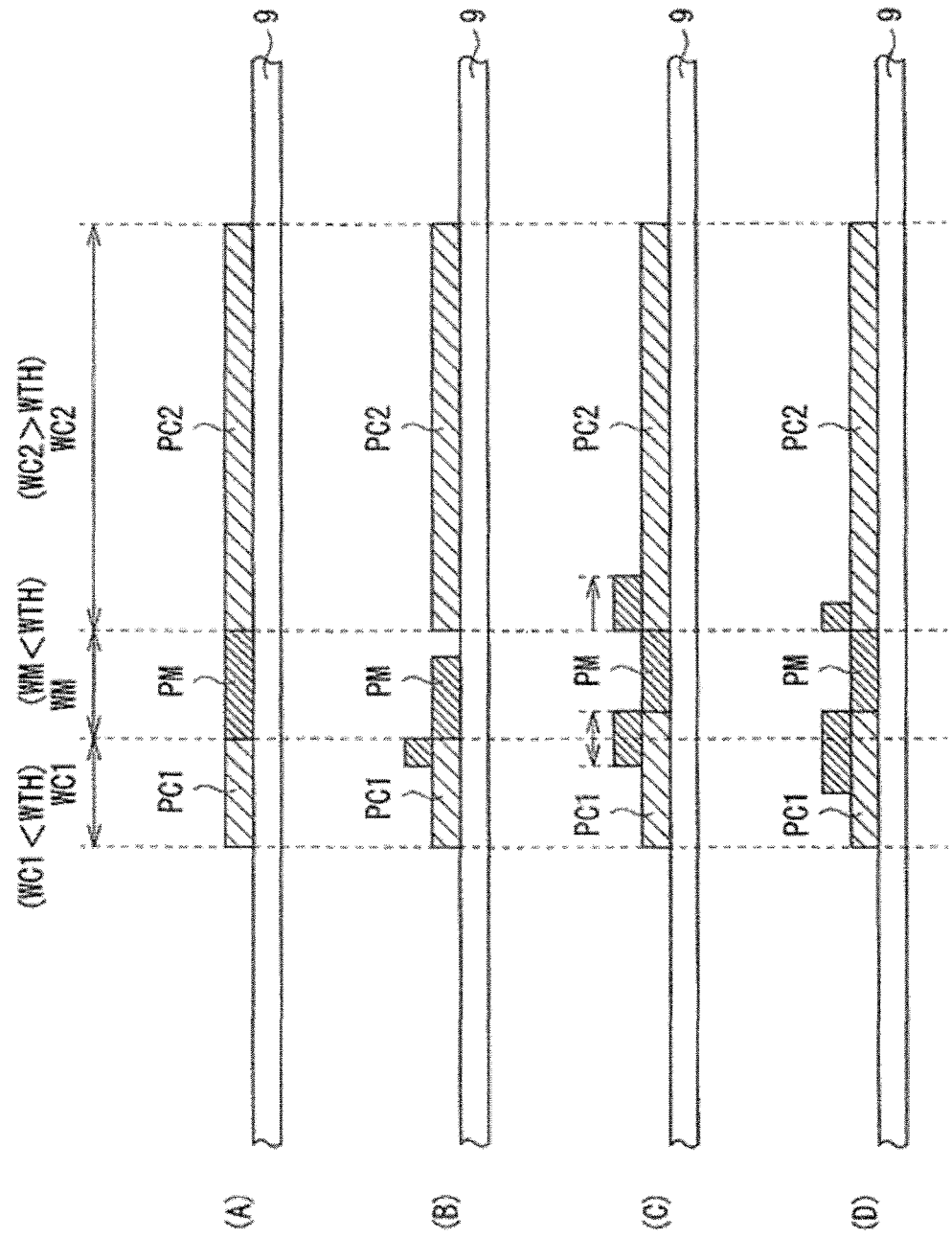
FIG. 25 is an explanatory view showing another operational example of the image forming apparatus shown in FIG. 1.

FIG. 25 schematically shows an example of an image formation when a magenta color image PM having a low lightness and a cyan color image PC having a high lightness is formed on a recording medium 9. In this example, a cyan color image PC1 is formed on the left side of the magenta color image PM and a cyan color image PC2 is formed on the right side of the magenta color image PM. At that time, the width WM of the magenta color image PM and the width WC1 of the cyan color image PC1 in a case in which a trapping process is not performed are set to be narrower than the width WTH corresponding to the threshold TH3, and the width WC2 of the cyan color image PC2 is set to be wider than the width WTH corresponding to the threshold TH3.

Also in this case, when the image forming part 12 forms a cyan color image PC and a magenta color image PM on a recording medium 9, if a relative deviation occurs in the forming positions of these images, as shown in (B) of FIG. 25, a part of the surface of the white recording medium 9 is exposed. At this time, for example, similarly to the specific example E3 ((C) of FIG. 14), when the magenta color image PM having a narrow width WM is expanded, since the magenta color image PM also expands into the region of the cyan color image PC1 having a narrow width WC1, the image quality may decrease.

On the other hand, in the image forming apparatus 1, as shown in (C) of FIG. 25, in a trapping process, both the left edge of the magenta color image PM and the right edge of the cyan color image PC1 are moved in opposite directions from each other to expand both the magenta color image PM and the cyan color image PC1. That is, when cyan color image data DC is selected at Step S22, since the widths WC1, WM are narrower than the width WTH corresponding to the threshold TH3 ("N" at Steps S44, S46, S47), at Steps S48 and S49, the image forming apparatus 1 corrects the magenta color image data DM to expand the magenta color image PM. Specifically, the image forming apparatus 1 expands the magenta color image PM by moving the left edge of the magenta color image PM to the left only by half of the case of (C) of FIG. 14. In addition, in a case in which the magenta color image data DM is selected at Step S22, since the widths WC1, WM are narrower than the width WTH corresponding to the threshold TH3 ("N" at Steps S44, S46, S47, at Steps S48 and S49), the image forming apparatus 1 corrects the cyan color image data DC to narrow the cyan color image PC1. Specifically, the image forming apparatus 1 expands the cyan color image PC1 by moving the right edge of the cyan color image PC1 to the right only by half of the case of (C) of FIG. 14.

As a result, in the image forming apparatus 1, when the image forming part 12 forms an image, even if a relative deviation occurs in the forming position of the image, as shown in (D) of FIG. 25, the risk of the exposure of the surface of the recording medium 9 can be reduced, and it is also possible to reduce the possibility that the magenta color image PM expands to the region of the cyan color image PC1 having a narrow width WC1. As a result, in the image forming apparatus 1, image quality can be increased.

Figure 26:
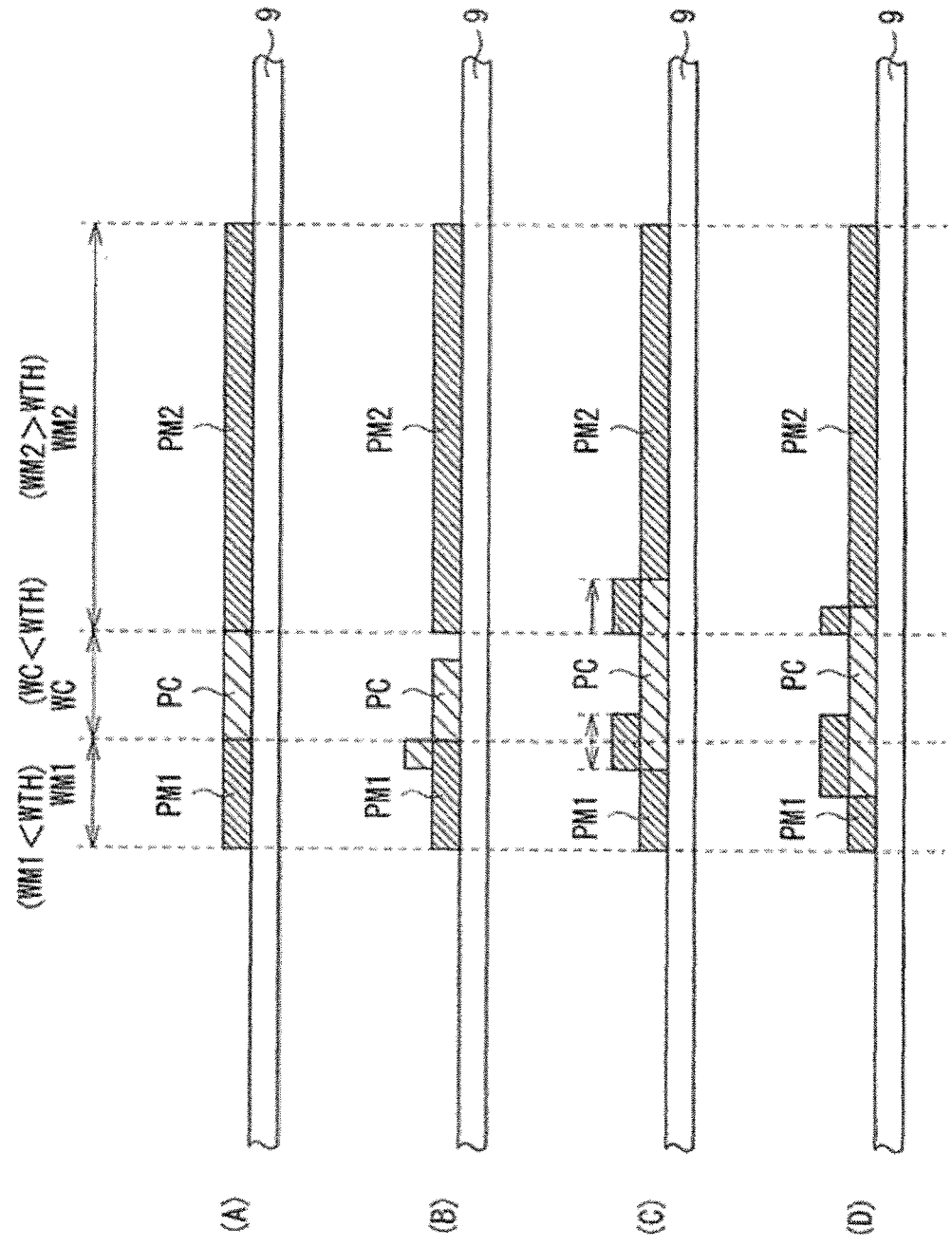
FIG. 26 is an explanatory view showing another operational example of the image forming apparatus shown in FIG. 1.

FIG. 26 shows an example in which a magenta color image PM1 is formed on the left side of cyan color image PC and a magenta color image PM2 is formed on the right side of a cyan color image PC. Also in this case, as shown in (C) of FIG. 26, the image forming apparatus 1 moves both the left edge of the cyan color image PC and the right edge of the magenta color image PM1 in the opposite directions by a trapping process to expand both the cyan color image PC and the magenta color image PM1. With this, in the image forming apparatus 1, when the image forming part 12 forms an image, even if a relative deviation occurs in the forming position of the image, as shown in (D) of FIG. 26, the risk of the exposure of the surface of the recording medium 9 can be reduced, and it is also possible to reduce the possibility that the cyan color image PC expands to the region of the magenta color image PM1 having a narrow width WM1. As a result, in the image forming apparatus 1, the image quality can be enhanced.

(Specific Example E6)

Figure 27:
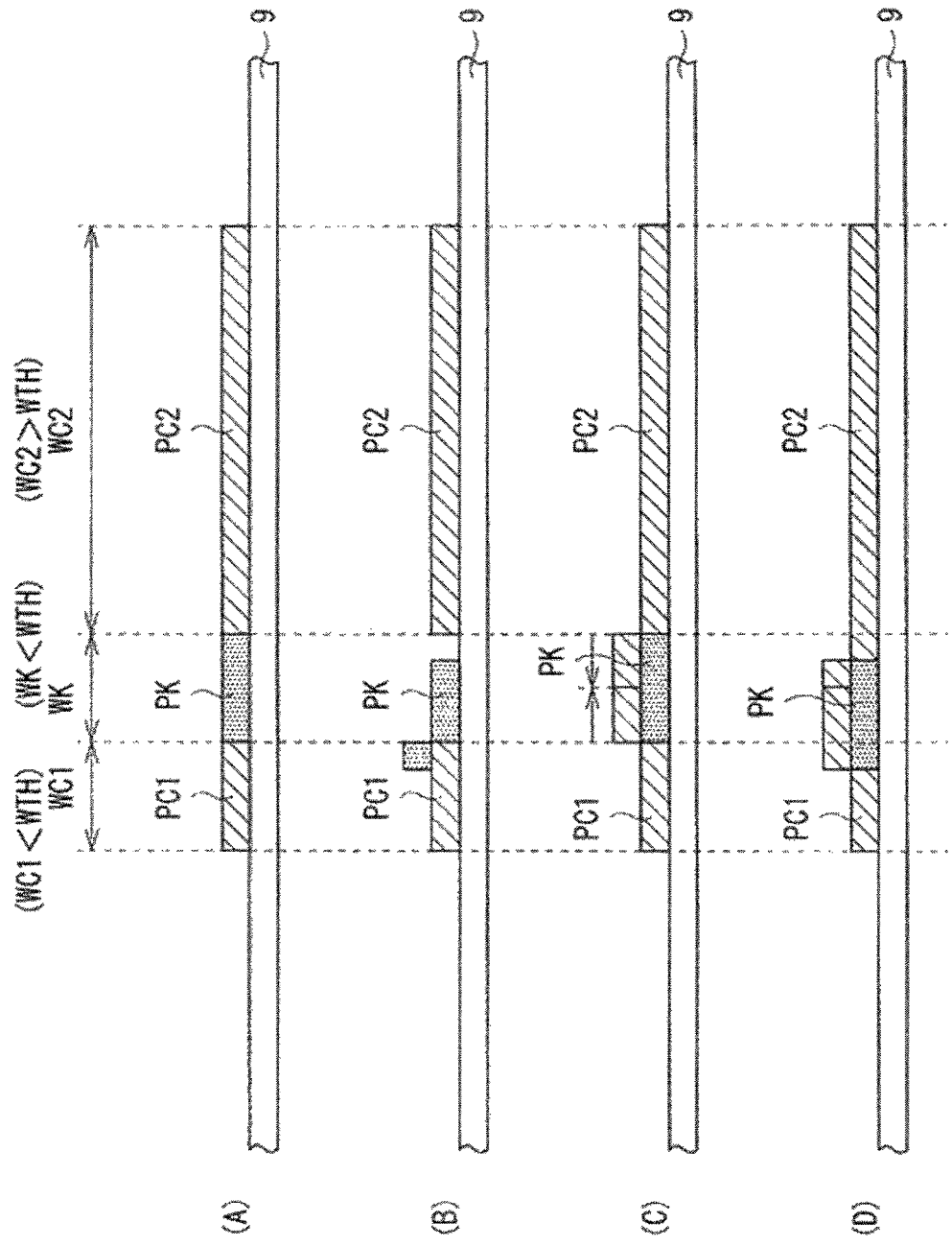
FIG. 27 is an explanatory view showing another operational example of the image forming apparatus shown in FIG. 1.

FIG. 27 schematically shows an example of an image formation in a case in which a black color image PK with a high degree of blackness and a cyan color image PC are formed on a recording medium 9. In this example, a cyan color image PC1 is formed on the left side of the black color image PK and a cyan color image PC2 is formed on the right side of the black color image PK. At that time, the width WK of the black color image PK and the width WC1 of the cyan color image PC1 in a case in which a trapping process is not performed are set to be narrower than the width WTH corresponding to the threshold TH3, and the width WC2 of the cyan color image PC2 is set to be wider than the width WTH corresponding to the threshold TH3.

Also in this case, when the image forming part 12 forms a black color image PK and a cyan color image PC on the recording medium 9, when a relative deviation occurs in the forming positions of these images, as shown in (B) of FIG. 27, a part of the surface of the white recording medium 9 is exposed.

In this case, for example, in the same manner as in the case of the specific example E5 (FIG. 25 (C)), when both the left edge of the black color image PK and the right edge of the cyan color image PC1 are moved in the opposite directions each other, the black color image PK expands and the object becomes thick.

Therefore, in the image forming apparatus 1, as shown in (C) of FIG. 27, the cyan color image PC adjacent to the black color image PK having a high degree of blackness is expanded by a trapping process. That is, when black color image data DK is selected at Step S22, since the target pixel A is a black pixel ("N" at Step S42), the image forming apparatus 1 corrects the cyan color image data DC at Step S49 to expand the cyan color image PC. Specifically, as shown in (C) of FIG. 27, the image forming apparatus 1 expands the cyan color image PC by moving the right edge of the cyan color image PC1 to the right.

With this, in the image forming apparatus 1, when the image forming part 12 forms an image, even if a relative deviation occurs in the forming position of the image, as shown in (D) of FIG. 27, the risk of the exposure of the surface of the recording medium 9 can be reduced, and the width of the black color image PK can also be maintained. As a result, in the image forming apparatus 1, the image quality can be enhanced.

Figure 28:
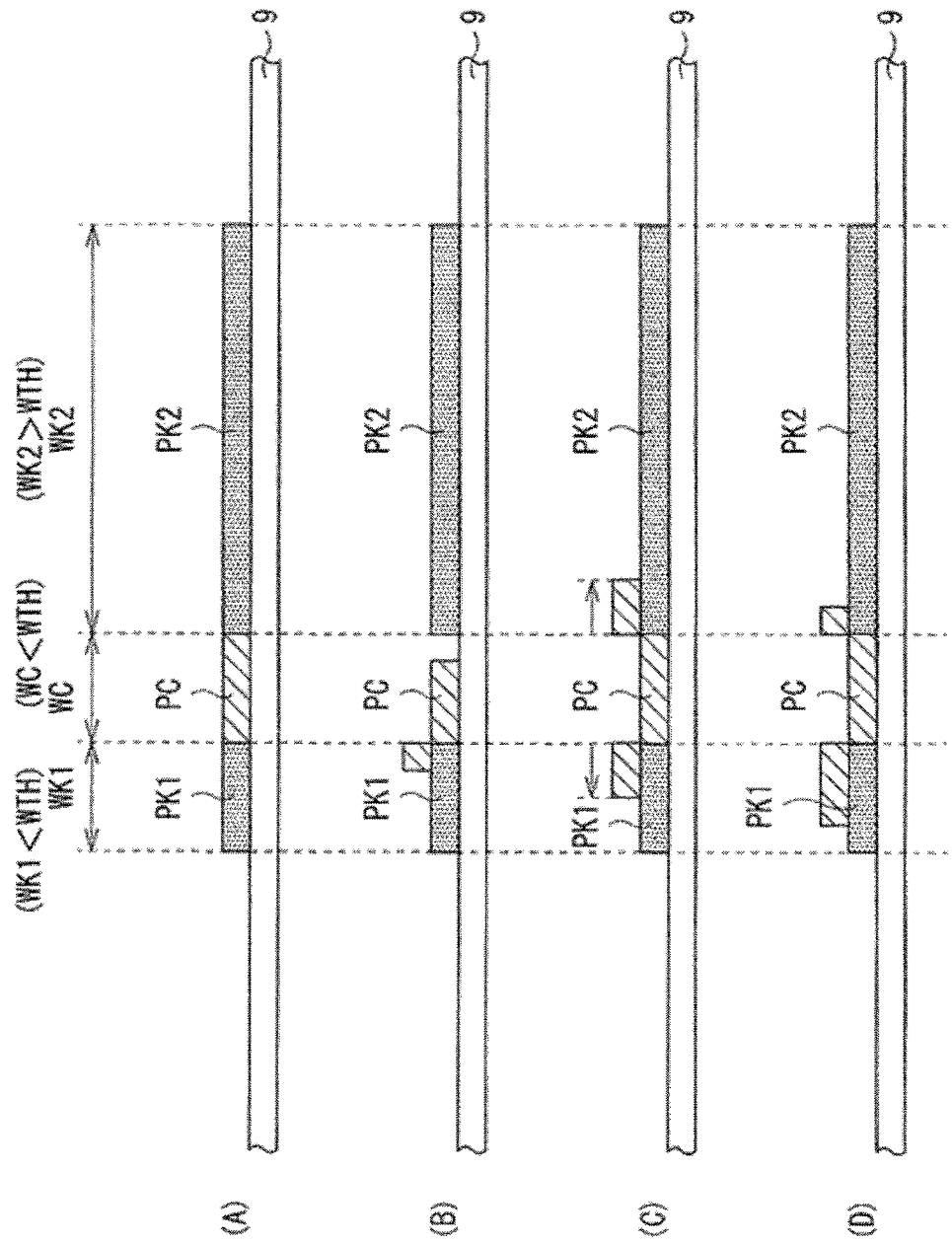
FIG. 28 is an explanatory view showing another operational example of the image forming apparatus shown in FIG. 1.

FIG. 28 shows an example of a case in which a black color image PK1 is formed on the left side of the cyan color image PC and a black color image PK2 is formed on the right side of the cyan color image PC. Also in this case, as shown in (C) of FIG. 28, the image forming apparatus 1 expands the cyan color image PC adjacent to the black color image PK having a high degree of blackness by a trapping process. Specifically, the image forming apparatus 1 expands the cyan color image PC by moving the left edge of the cyan color image PC to the left. As a result, in the image forming apparatus 1, when the image forming part 12 forms an image, even if a relative deviation occurs in the forming position of the image, as shown in (D) of FIG. 28, the risk of the exposure of the surface of the recording medium 9 can be reduced and the width of the cyan color image PC can also be maintained. As a result, in the image forming apparatus 1, the image quality can be enhanced.

[Effects]

As described above, in the present embodiment, since a yellow color image, a magenta color image, and a cyan color image adjacent to a black color image are expanded in a trapping process, the width of the black color image can be maintained, and therefore, the image quality can be enhanced.

In this embodiment, when the width of the black color image is narrow, the yellow color image, the magenta color image, and the cyan color image adjacent to the black color image are expanded. Therefore, the possibility that the object shown by the black color image appears thick can be reduced, and the image quality can be improved.

[Modified Embodiment 1-1]

In the aforementioned embodiment, one example of a generation method of edge direction data DIR, edge distance data DIS, and width data DLW was shown, but it is not limited to the method, and other methods may be used.

[Modified Embodiment 1-2]

In the aforementioned embodiment, the lightness was obtained based on the color image data D, but the lightness can be obtained using various known methods.

[Modified Embodiment 1-3]

In the aforementioned embodiment, the image forming part 12 forms an image on a recording medium 9 using developers of four colors, which are yellow, magenta, cyan, and black, but the present invention is not limited to this, and alternatively, images may be formed on a recording medium 9 using developers of five colors, which are yellow, magenta, cyan, black, and white. In this case, it is desirable that the image processing part 20 generates 5 color image data D (color image data DY, DM, DC, DK, DW) based on print data DP and performs a trapping process on each color image data D. The color image data DW is image data corresponding to an image to be formed using a white developer.

Although the present technology is explained by exemplifying the embodiment and several modified embodiments, the present technology is not limited to these embodiments and the like, and various modifications are possible. For example, in the aforementioned embodiments, etc., the present invention is applied to an image forming apparatus, but the present invention is not limited to this. In addition, the present invention can be applied to a multi-function peripheral device (MFP; Multi Function Peripheral) having functions of copy, facsimile, scanner, etc.).

Also, for example, in the aforementioned embodiments, etc., lightness is used as one specific example of the "degree of brightness" in the present invention, but the present invention is not limited to this. Alternatively, for example, luminance may be used.

1 . . . image forming apparatus,
9 . . . recording medium,
11 . . . communication part,
12 . . . image forming part,
20 . . . image processing part,
21 . . . color image generation part,
22 . . . edge detection part,
23 . . . black color judgment part,
24 . . . correction part,
A . . . target pixel,
B . . . edge portion,
B1, B2 . . . pixel,
D, DY, DM, DC, DK, E, EY, EM, EC, EK . . . color image data,
DBK . . . black color judgment data,
DBN . . . binary data,
DIR . . . edge direction data,
DIS . . . edge distance data,
DLW . . . width data,
PC, PC1, PC2 . . . cyan color image,
PM, PM1, PM2 . . . magenta color image,
PK, PK1, PK2 . . . black color image,
TH0, TH1, TH2, TH3 . . . threshold,
WC, WC1, WC2, WM, WM1, WM2, WK, WK1, WK2 . . . width.

What is claimed is:

1. An image forming apparatus, comprising:
  an image processing part that performs a correction process to correct a first image data and a second image data, the first image data corresponding to a black developer and the second image data corresponding to a color developer that is other than the black developer, and
  an image forming part that respectively forms a first image and a second image on a recording medium based on the first image data and the second image data that are corrected by the image processing part, wherein
  the first image is bordered on the second image so that the first and second images share a boundary,
  at the boundary of the first and second images, the first image has a first edge portion and the second image has a second edge portion, the first and second edge portions being arranged along the boundary,
  when a first image width of the first image data is narrower than a predetermined width, the first image width being defined as a length determined from one portion of the first edge portion, the image processing part performs the correction process to move selectively one of the first edge portion and the second edge portion based on a pixel value of the first image, and
  the image processing part obtains a degree of blackness of the first image based on the pixel value of the first image,
  when the degree of blackness is higher than a predetermined value, the image processing part performs the correction process to move the second edge portion such that an image area of the second image data becomes larger.

2. The image forming apparatus according to claim 1, wherein
  in a case in which the first image width is narrower than the predetermined width,
  when the degree of blackness is lower than the predetermined value,
  the image processing part performs the correction process by moving the first edge portion such that an image area of the first image data becomes larger.

3. The image forming apparatus according to claim 2, wherein,
  in a case in which the first image width is narrower than the predetermined width and the degree of blackness is lower than the predetermined value, when a second image width of the second image data is narrower than the predetermined width, the second image width being defined as a length determined from one portion of the second edge portion,
  the image processing part performs the correction process by moving the first edge portion such that the image area of the first image data becomes larger and
  the second edge portion such that the image area in the second image data becomes larger.

4. The image forming apparatus according to claim 3, wherein
  in a case in which the first image width and the second image width are narrower than the predetermined width,
  when the degree of blackness is higher than the predetermined value, the image processing part performs the correction process by moving the second edge portion by a first amount such that the image area of the second image data becomes larger, and
  when the degree of blackness is lower than the predetermined value, the image processing part performs the correction process by moving the first edge portion by a second amount that is smaller than the first amount such that the image area of the first image data becomes larger, and by moving the second edge portion only by the second amount such that the image area of the second image data becomes larger.

5. The image forming apparatus according to claim 2, wherein
the image processing part obtains the degree of blackness based on a pixel value of a third image portion of the second image data in addition to the pixel value of the first image, the third image portion corresponding to the first image.

6. The image forming apparatus according to claim 1, wherein
in a case in which the first image width is wider than the predetermined width,
when the degree of blackness is lower than the predetermined value,
the image processing part performs the correction process by selectively moving one or both of the first edge portion and the second edge portion based on a result of comparison between a first degree of brightness of the first image and a second degree of brightness of the second image, and
when the degree of blackness is higher than the predetermined value,
the image processing part performs the correction process by moving the second edge portion such that the image area of the second image data becomes larger.

7. The image forming apparatus according to claim 6, wherein
in a case in which the first image width is wider than the predetermined width and the degree of blackness is lower than the predetermined value,
when the first degree of brightness is higher than the second degree of brightness, the image processing part performs the correction process by moving the first edge portion such that the image area of the first image data becomes larger, and
when the second degree of brightness is higher than the first degree of brightness, the image processing part performs the correction process by moving the second edge portion such that the image area in the second image data becomes larger.

8. The image forming apparatus according to claim 1, wherein
the color developer other than the black color is any one of yellow, magenta, and cyan developers,
the image forming apparatus further comprises an edge detection part, wherein
the edge detection part
selects one of colors corresponding to multiple image data,
generates edge direction data (DIR) by using one pixel, which is determined as a target pixel, and other pixels surrounding the target pixel, the edge direction data indicating an edge direction, and
generates width data (DLW) by using pixels that are aligned along either the edge direction or an opposite direction from the edge direction, and
the image processing part compares the first image width of the first image with the predetermined width wherein the first image width is obtained by the edge detection part.

9. An image forming apparatus, comprising:
an image processing part that performs a correction process to correct a first image data and a second image data, the first image data corresponding to a black developer and the second image data corresponding to a color developer that is other than the black developer,
an image forming part that respectively forms a first image and a second image on a recording medium based on the first image data and the second image data that are corrected by the image processing part,
a color judgment part that performs a judgment process to judge whether or not each pixel, which is contained in the first image data, is a black pixel, wherein
the first image is bordered on the second image so that the first and second images share a boundary,
at the boundary of the first and second images, the first image has a first edge portion and the second image has a second edge portion, the first and second edge portions being arranged along the boundary,
when a first image width of the first image data is narrower than a predetermined width wherein the first image width is defined as a length determined from one portion of the first edge portion, and when the color judgment part judges that one pixel of the first image data is a black pixel through the judgment process, the image processing part performs the correction process to move the second edge portion such that an image area of the second image data becomes larger.

10. The image forming apparatus according to claim 9, wherein
the image processing part obtains a degree of blackness of the first image based on the pixel value of the first image, and
the color judgment part performs the judgment process by comparing the degree of blackness of the first image with a predetermined value (TH0).

11. The image forming apparatus according to claim 10, wherein
in a case in which the first image width is narrower than the predetermined width,
when the degree of blackness is lower than the predetermined value,
the image processing part performs the correction process by moving the first edge portion such that an image area of the first image data becomes larger.

12. The image forming apparatus according to claim 11, wherein,
in a case in which the first image width is narrower than the predetermined width and the degree of blackness is lower than the predetermined value, when a second image width of the second image data is narrower than the predetermined width, the second image width being defined as a length determined from one portion of the second edge portion,
the image processing part performs the correction process by moving the first edge portion such that the image area of the first image data becomes larger and
the second edge portion such that the image area in the second image data becomes larger.

13. The image forming apparatus according to claim 12, wherein
in a case in which the first image width and the second image width are narrower than the predetermined width,
when the degree of blackness is higher than the predetermined value, the image processing part performs the correction process by moving the second edge portion by a first amount such that the image area of the second image data becomes larger, and
when the degree of blackness is lower than the predetermined value, the image processing part performs the correction process by moving the first edge portion by a second amount that is smaller than the first amount such that the image area of the first image data becomes larger, and by moving the second edge portion only by the second amount such that the image area of the second image data becomes larger.

14. The image forming apparatus according to claim 11, wherein
the image processing part obtains the degree of blackness based on a pixel value of a third image portion of the second image data in addition to the pixel value of the first image, the third image portion corresponding to the first image.

15. The image forming apparatus according to claim 9, wherein
in a case in which the first image width is wider than the predetermined width,
when the degree of blackness is lower than the predetermined value,
the image processing part performs the correction process by selectively moving one or both of the first edge portion and the second edge portion based on a result of comparison between a first degree of brightness of the first image and a second degree of brightness of the second image, and
when the degree of blackness is higher than the predetermined value,
the image processing part performs the correction process by moving the second edge portion such that the image area of the second image data becomes larger.

16. The image forming apparatus according to claim 15, wherein
in a case in which the first image width is wider than the predetermined width and the degree of blackness is lower than the predetermined value,
when the first degree of brightness is higher than the second degree of brightness, the image processing part performs the correction process by moving the first edge portion such that the image area of the first image data becomes larger, and
when the second degree of brightness is higher than the first degree of brightness, the image processing part performs the correction process by moving the second edge portion such that the image area in the second image data becomes larger.

17. The image forming apparatus according to claim 9, wherein
the color developer other than the black color is any one of yellow, magenta, and cyan developers,
the image forming apparatus further comprises an edge detection part, wherein
the edge detection part
selects one of colors corresponding to multiple image data,
generates edge direction data (DIR) by using one pixel, which is determined as a target pixel, and other pixels surrounding the target pixel, the edge direction data indicating an edge direction, and
generates width data (DLW) by using pixels that are aligned along either the edge direction or an opposite direction from the edge direction, and
the image processing part compares the first image width of the first image with the predetermined width wherein the first image width is obtained by the edge detection part.

18. An image forming apparatus, comprising:
an image processing part that performs a correction process to correct a first image data and a second image data, the first image data corresponding to a black developer and the second image data corresponding to a color developer that is other than the black developer, and
an image forming part that respectively forms a first image and a second image on a recording medium based on the first image data and the second image data that are corrected by the image processing part, wherein
the first image is bordered on the second image so that the first and second images share a boundary,
at the boundary of the first and second images, the first image has a first edge portion and the second image has a second edge portion, the first and second edge portions being arranged along the boundary,
when a first image width of the first image data is narrower than a predetermined width wherein the first image width is defined as a length determined from one portion of the first edge portion, and when a pixel value of the first image data is higher than a predetermined value (TH0), the image processing part performs the correction process to move the second edge portion such that an image area of the second image data becomes larger.

19. The image forming apparatus according to claim18, wherein
in a case in which the first image width is narrower than the predetermined width,
when the pixel value of the first image data is lower than the predetermined value,
the image processing part performs the correction process by moving the first edge portion such that an image area of the first image data becomes larger.

20. The image forming apparatus according to claim18, further comprising:
an edge detection part, wherein
the edge detection part
selects one of colors corresponding to multiple image data,
generates edge direction data (DIR) by using one pixel, which is determined as a target pixel, and other pixels surrounding the target pixel, the edge direction data indicating an edge direction, and
generates width data (DLW) by using pixels that are aligned along either the edge direction or an opposite direction from the edge direction, and
the image processing part compares the first image width of the first image with the predetermined width wherein the first image width is obtained by the edge detection part.

* * * * *